US011498300B2

(12) United States Patent
Hartung

(10) Patent No.: US 11,498,300 B2
(45) Date of Patent: Nov. 15, 2022

(54) COMPACTOR ARRANGEMENT AND METHOD FOR OPERATING A COMPACTOR ARRANGEMENT

(71) Applicant: Wincor Nixdorf International, GmbH, Paderborn (DE)

(72) Inventor: Domenic Hartung, Molsdorf (DE)

(73) Assignee: Wincor Nixdorf International GmbH, Paderborn (DE)

( * ) Notice: Subject to any disclaimer, the term of this patent is extended or adjusted under 35 U.S.C. 154(b) by 0 days.

(21) Appl. No.: 16/758,755

(22) PCT Filed: Oct. 22, 2018

(86) PCT No.: PCT/EP2018/078886
§ 371 (c)(1),
(2) Date: Jan. 21, 2021

(87) PCT Pub. No.: WO2019/081425
PCT Pub. Date: May 2, 2019

(65) Prior Publication Data
US 2021/0138753 A1 May 13, 2021

(30) Foreign Application Priority Data

Oct. 23, 2017 (EP) ..................................... 17197701

(51) Int. Cl.
*B30B 9/30* (2006.01)
*B30B 9/32* (2006.01)
*G07F 7/06* (2006.01)

(52) U.S. Cl.
CPC ............ *B30B 9/3007* (2013.01); *B30B 9/321* (2013.01); *G07F 7/06* (2013.01)

(58) Field of Classification Search
CPC .......... B30B 9/3007; B30B 9/321; G07F 7/06
(Continued)

(56) References Cited

U.S. PATENT DOCUMENTS

2012/0173014 A1* 7/2012 Morishita ................. B08B 3/02
700/224
2016/0288996 A1 10/2016 Arsovic
2017/0140600 A1 5/2017 Halsey, Jr.

FOREIGN PATENT DOCUMENTS

DE    19707464 A1   11/1997
EP     2249320 A1   11/2010
(Continued)

*Primary Examiner* — Jimmy T Nguyen
(74) *Attorney, Agent, or Firm* — Black, McCuskey, Souers & Arbaugh LPA

(57) ABSTRACT

According to various embodiments, a compactor arrangement (202) may have the following: a function module arrangement (1002), which is installed on a support framework (204a) above an empty-container transport device (202t), wherein the function module arrangement (1002) has: a module receptacle (1004) for receiving multiple function modules (1006), the multiple function modules (1006), which are designed to match the module receptacle (1004) such that the multiple function modules (1006) can each be selectively received in multiple configurations (1100c, 1100d, 1100e, 1100f) in the module receptacle (1004), at least one processor (1008) which is configured to ascertain an actual configuration of the multiple configurations (1100c, 1100d, 1100e, 1100f) and to operate the function module arrangement (1002) and/or the compactor arrangement (202) on the basis of the ascertained actual configuration.

14 Claims, 22 Drawing Sheets

(58) Field of Classification Search
USPC .......................................................... 100/902
See application file for complete search history.

(56) References Cited

FOREIGN PATENT DOCUMENTS

| | | |
|---|---|---|
| EP | 2521104 A1 | 11/2012 |
| EP | 3166089 A1 | 5/2017 |
| EP | 3208214 A1 | 8/2017 |
| WO | 2005003003 A1 | 1/2005 |
| WO | 2014106687 A1 | 7/2014 |
| WO | 2017060288 A1 | 4/2017 |

* cited by examiner

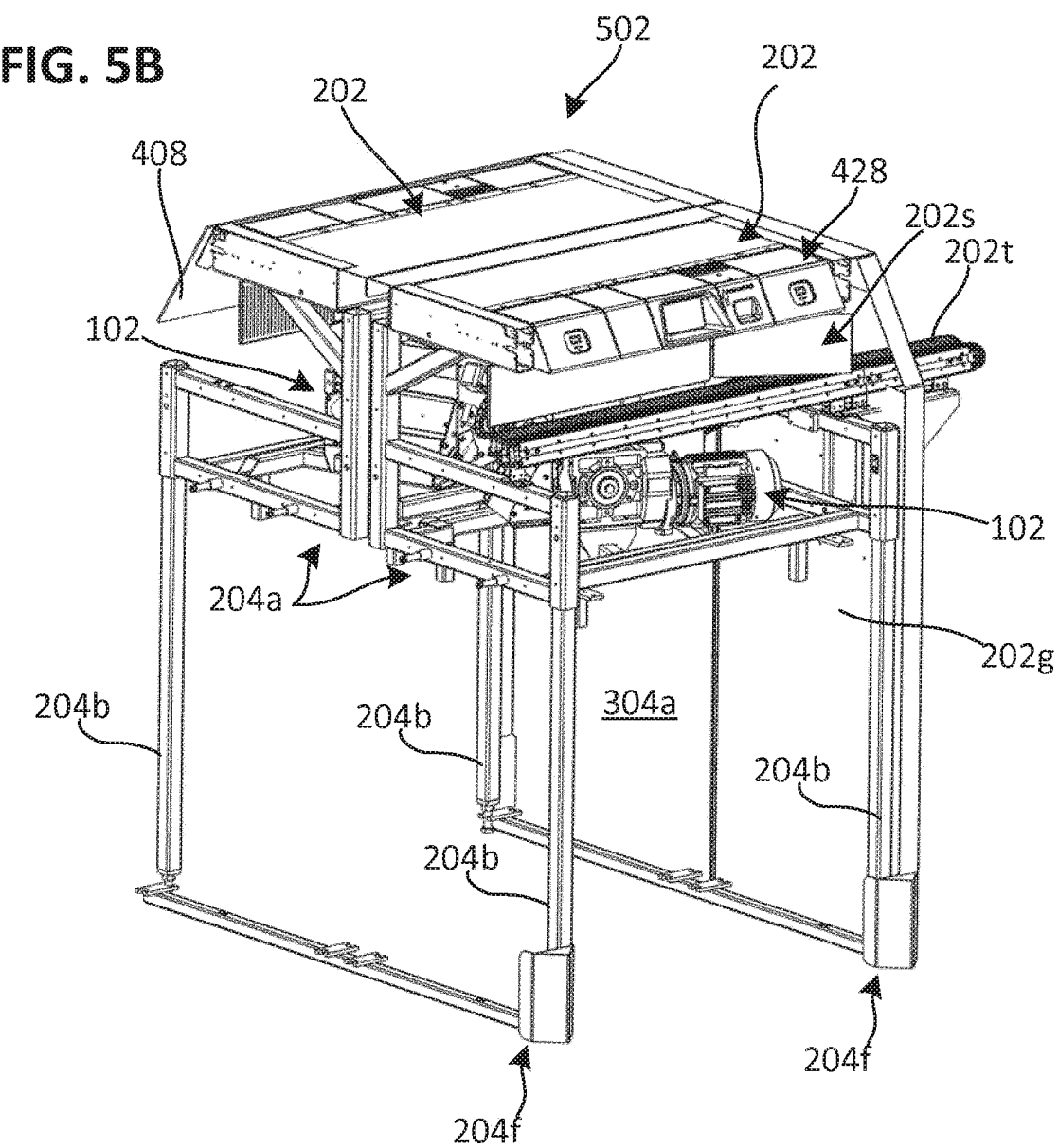

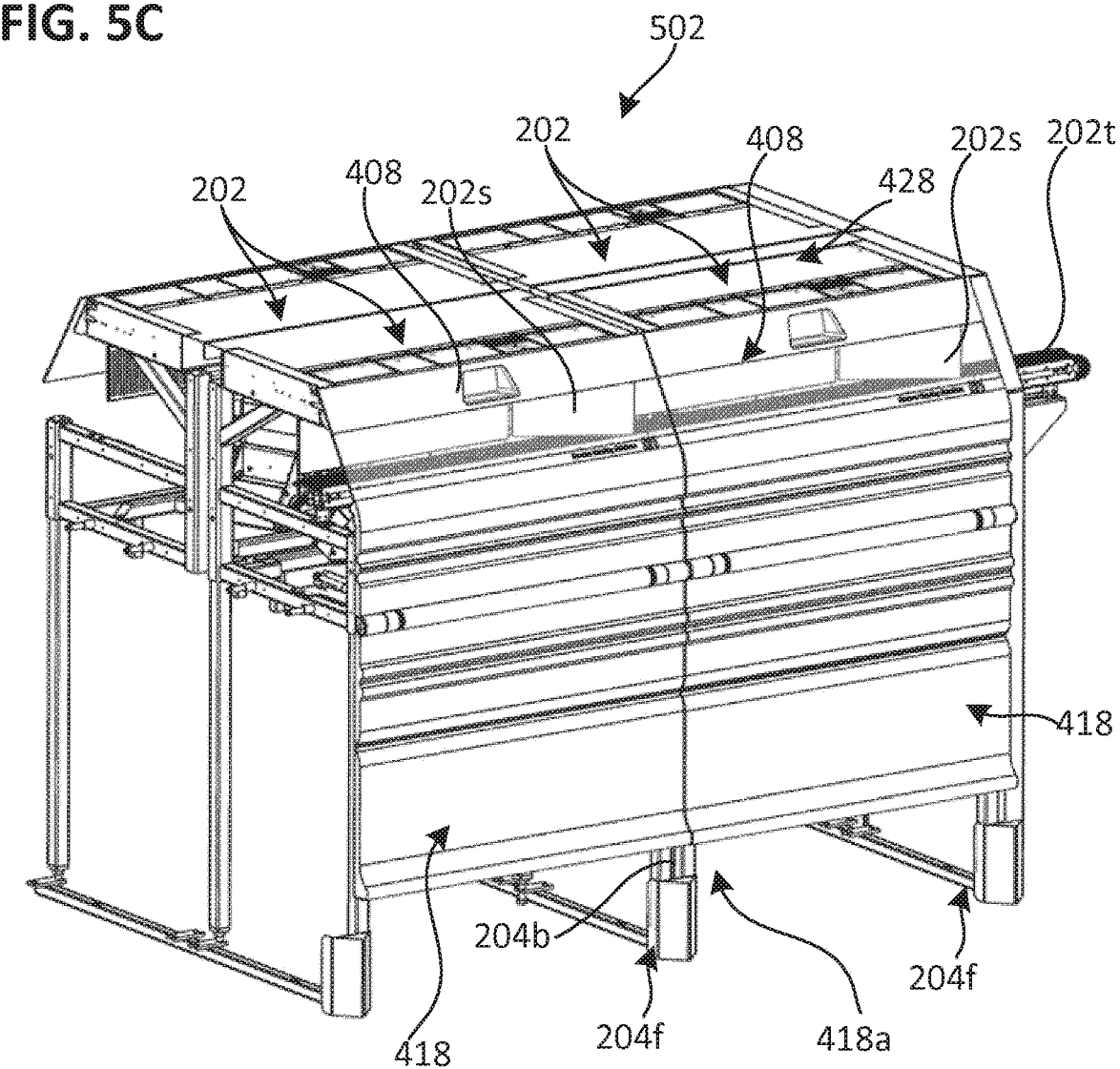

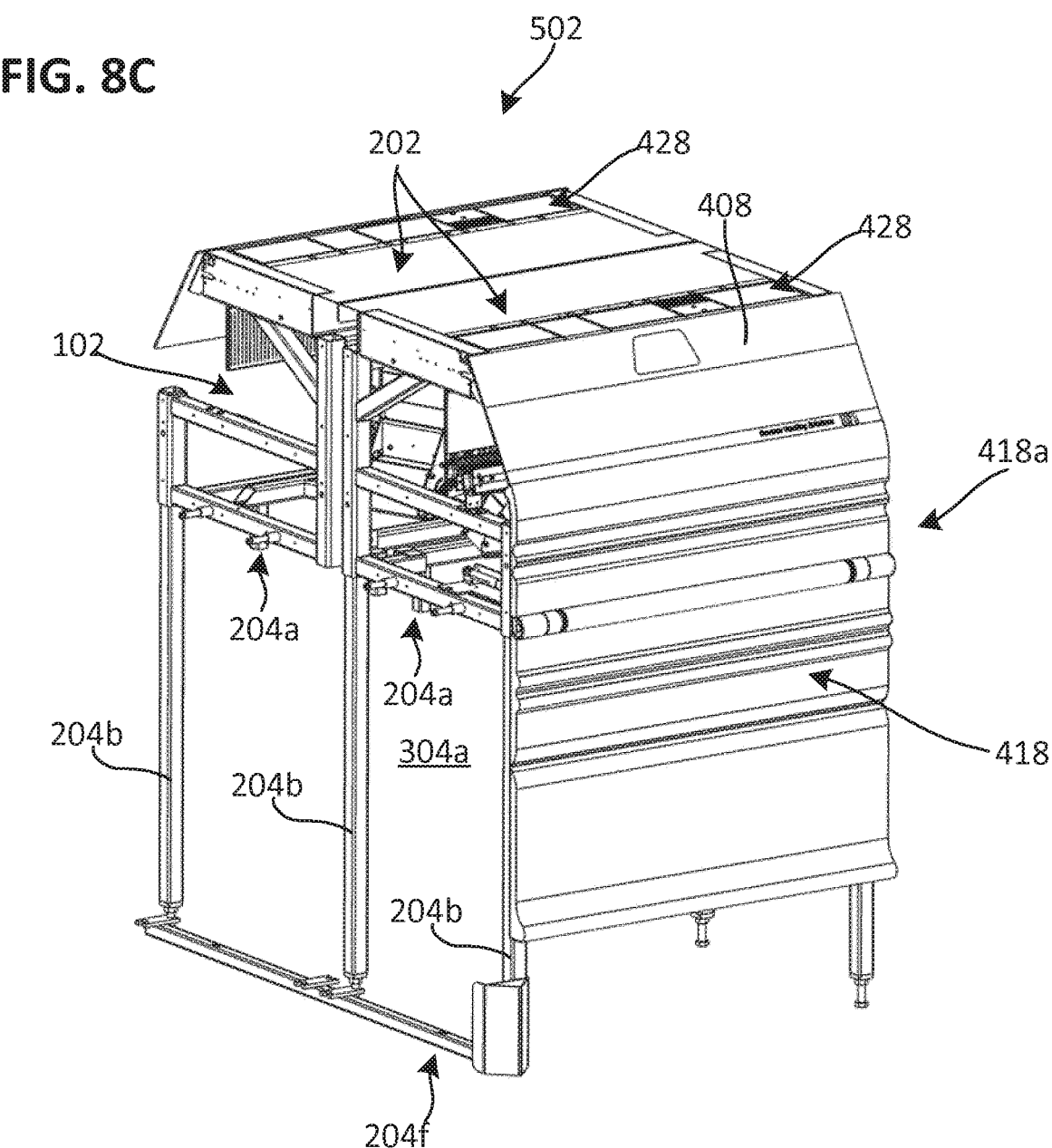

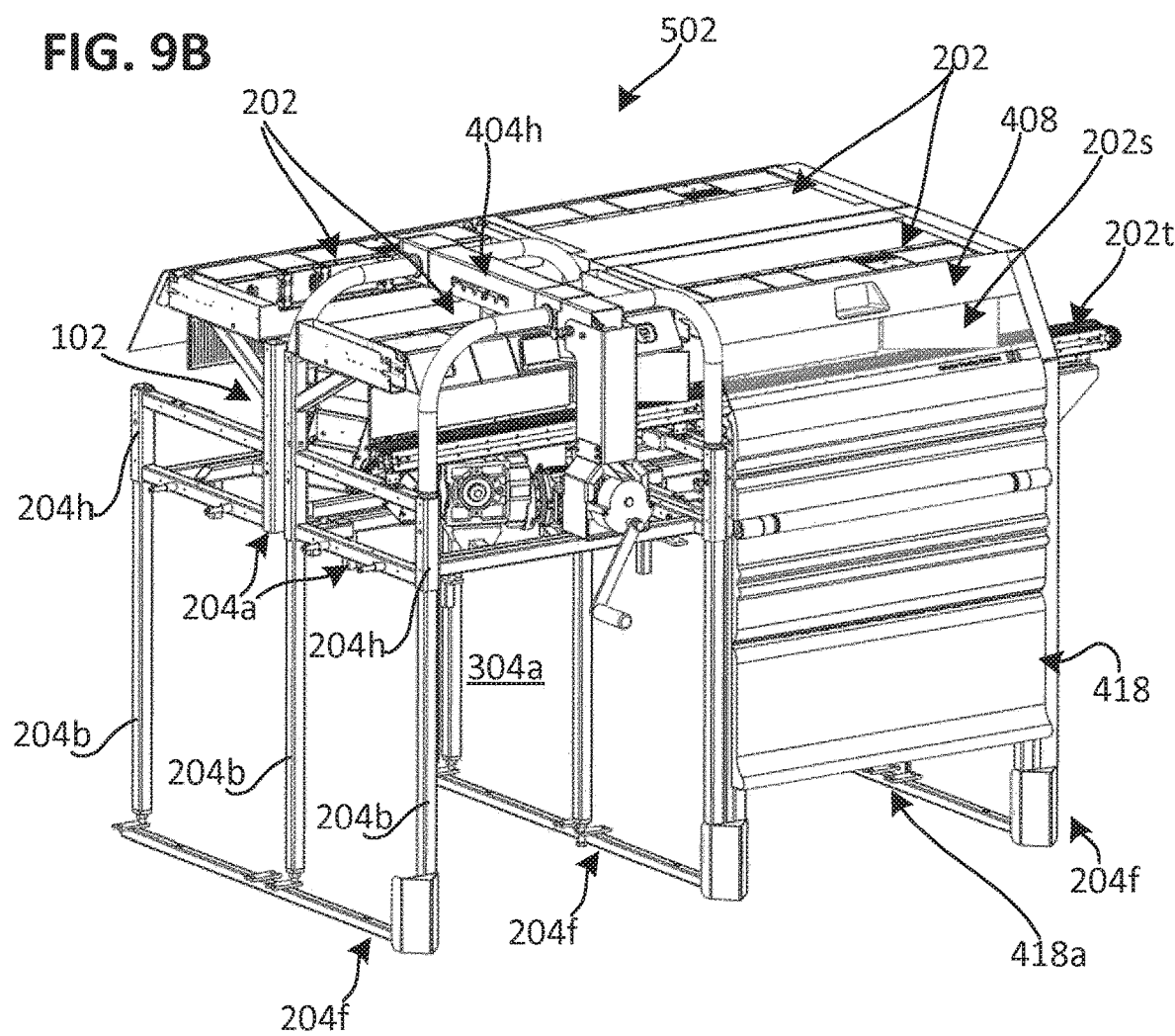

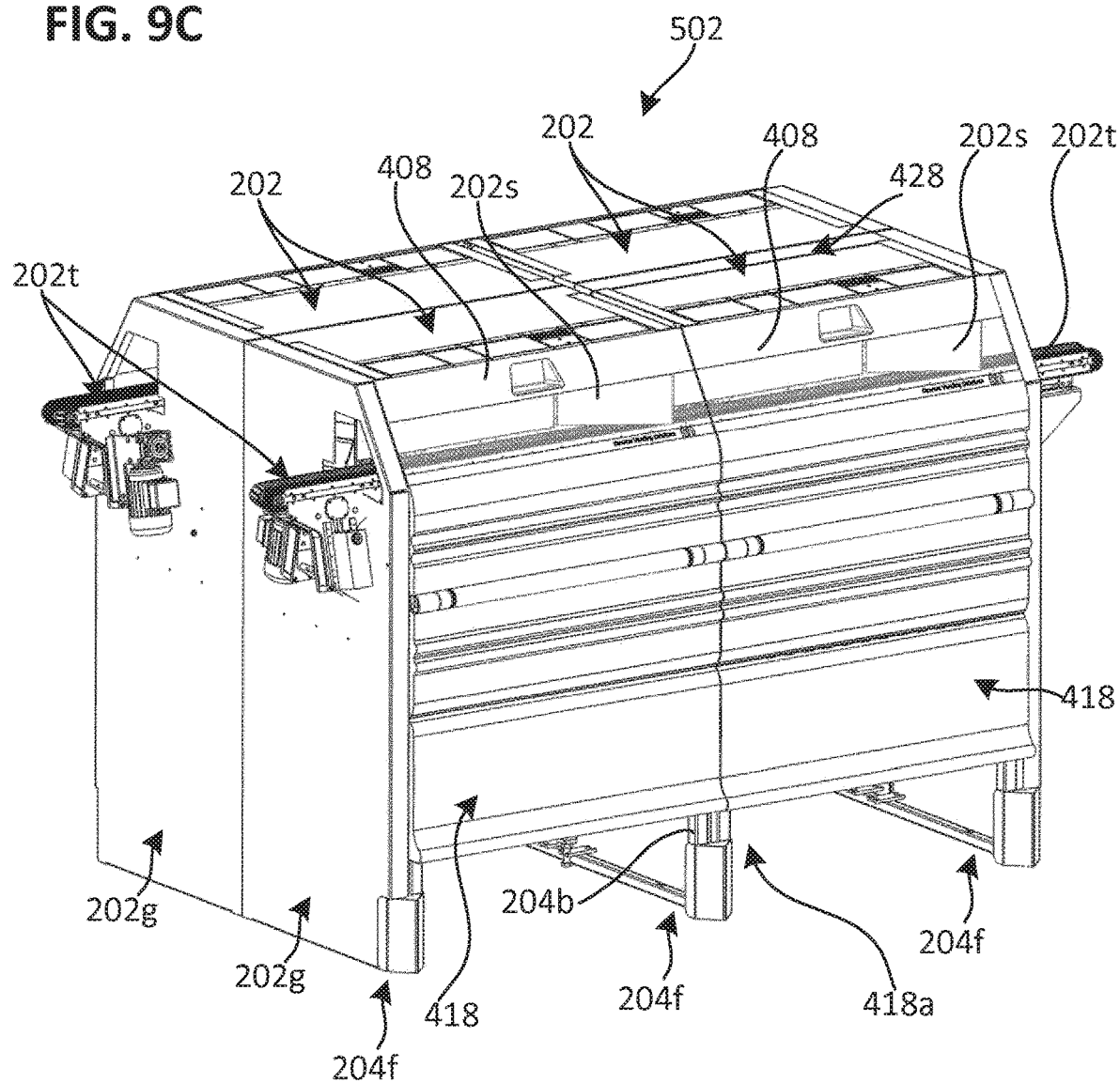

COMPACTOR ARRANGEMENT AND METHOD FOR OPERATING A COMPACTOR ARRANGEMENT

CROSS-REFERENCE TO RELATED APPLICATIONS

This application is the U.S. National Stage Entry of PCT/EP2018/078886, filed Oct. 22, 2018 which claims priority to and the benefit of European Patent Application 17197701.0, Filed Oct. 23, 2017.

BACKGROUND AND BRIEF SUMMARY OF THE INVENTION

Various exemplary embodiments relate to a compactor arrangement, a compactor means, a function module arrangement, and a method for operating a compactor arrangement.

In general, different concepts are used for compacting objects, wherein the objects are broken up, pressed, and/or deformed in some other way in order to reduce the space requirement thereof. Owing to the introduced deposit system for single-use and reusable vessels (e.g. bottles, cans, glasses, etc.), automated return systems are increasingly being used to make the return of large quantities of vessels logistically easy. Such return systems can be used to sort the vessels for example according to type, material, etc. Furthermore, various options may be provided for the return of individual vessels or packagings (e.g. a box, etc.). In general, it may be necessary or helpful to comminute at least some of the returned vessels in order to enable them to be transported away efficiently. Here, it is for example possible for not only single-use plastics vessels but also single-use glass vessels etc. to be compacted. Reusable vessels and reusable packagings are generally collected separately and transported away without being compacted. In the food industry, the empty vessels are also referred to as empty containers, and the return system is also referred to as an empty-container return installation or empty-container return machine.

Various embodiments relate to a compactor arrangement, for example in use in an empty-container return installation or an empty-container return machine. According to various embodiments, the compactor arrangement may have a modular arrangement of multiple function modules which define the operation of the compactor arrangement.

According to various embodiments, a compactor arrangement may have a function module arrangement, wherein said function module arrangement has the following: a module receptacle for receiving multiple function modules, the multiple function modules, which can be selectively received in the module receptacle, wherein each function module of the multiple function modules is assigned an item of operating information in accordance with the function thereof; at least one processor (clearly an open-loop or closed-loop control means) which is configured to ascertain at least one item of operating information of at least one function module of the multiple function modules when the at least one function module is received in the module receptacle, and to operate the function module arrangement on the basis of the ascertained at least one item of operating information.

According to various embodiments, a compactor arrangement may have a function module arrangement, wherein said function module arrangement has the following: a module receptacle with multiple receptacle positions for receiving multiple function modules, the multiple function modules, which are designed to match the module receptacle in such a way that the multiple function modules can each be selectively received in multiple configurations in the module receptacle, at least one processor (clearly an open-loop or closed-loop control means) which is configured to ascertain an actual configuration (clearly an actually present configuration) of the multiple configurations and to selectively operate the function module arrangement in one operating mode out of multiple operating modes on the basis of the ascertained actual configuration.

According to various embodiments, a function module arrangement may have the following: a module receptacle, multiple function modules of different function module type, which are configured such that they can be selectively received in the module receptacle, and at least one processor which is configured to ascertain the function module type of at least one function module received in the module receptacle, and to operate the function module arrangement selectively in one operating mode of multiple operating modes on the basis on the ascertained function module type.

According to various embodiments, a compactor device may have one or more compactor arrangements, wherein each of the compactor arrangements has a function module arrangement.

According to various embodiments, a method for operating a compactor arrangement may comprise the following: transporting empty containers by means of an empty-container transport device in the compactor arrangement; configuring a function module arrangement, which is arranged above the empty-container transport device, by introducing multiple function modules into a module receptacle of the function module arrangement; ascertaining an actual configuration of the function module arrangement on the basis of the multiple function modules which are received in the module receptacle; and operating the function module arrangement in an operating mode which is assigned to the actual configuration.

Exemplary embodiments are illustrated in the figures and will be described in more detail below.

BRIEF DESCRIPTION OF THE SEVERAL VIEWS OF THE DRAWINGS

In the figures:

FIG. 5A to FIG. 5C each show multiple compactor arrangements in various schematic illustrations, according to various embodiments;

FIG. 8A to FIG. 8C show multiple compactor arrangements in various schematic illustrations, according to various embodiments;

FIG. 9A to FIG. 9C show multiple compactor arrangements in various schematic illustrations, according to various embodiments;

DETAILED DESCRIPTION OF THE INVENTION

In the following detailed description, reference is made to the accompanying drawings, which form a part hereof and in which, for illustrative purposes, there are shown specific embodiments in which the invention may be implemented. In this regard, directional terminology such as "upward", "downward", "forward", "rearward", "front", "rear", etc. is used with reference to the orientation of the figure(s) being described. Since components of embodiments may be positioned in a number of different orientations, the directional terminology serves for illustrative purposes, and is in no way limiting. It is self-evident that other embodiments may be utilized and structural or logical modifications may be made without departing from the scope of protection of the present invention. It is self-evident that the features of the various exemplary embodiments described herein may be combined with one another, unless specifically stated otherwise. The following detailed description is therefore not to be understood in a limiting sense, and the scope of the present invention is defined by the appended claims.

In the context of this description, the terms "connected", "attached", "linked" and "coupled" are used to describe both a direct and an indirect connection, a direct or indirect attachment, a direct or indirect link and a direct or indirect coupling. In the figures, identical or similar elements are denoted by identical reference symbols, as far as this is appropriate.

Figure 1A:
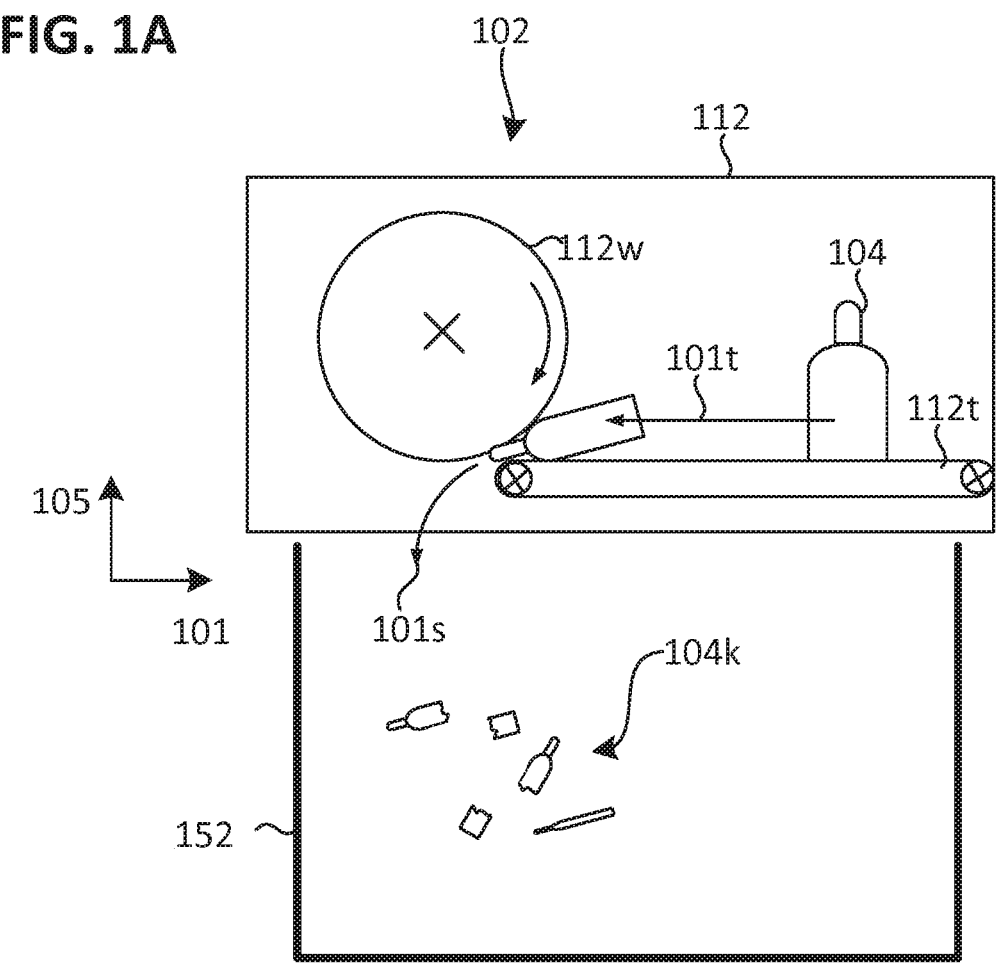
FIG. 1A and FIG. 1B show a compactor in various schematic illustrations, according to various embodiments.
Figure 1B:
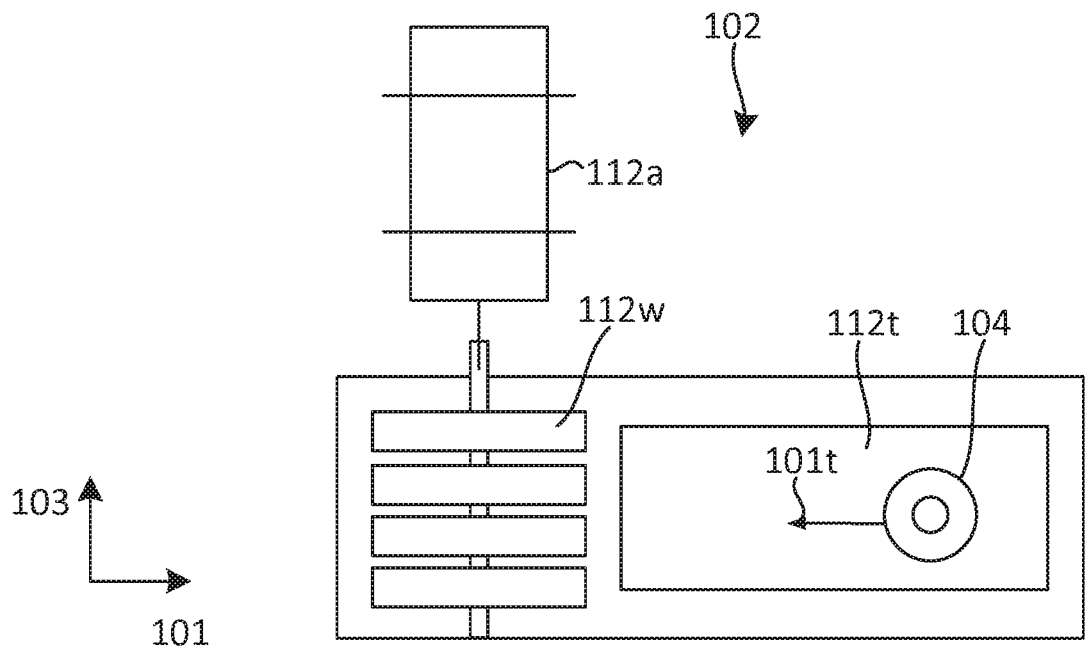

FIG. 1A and FIG. 1B illustrate a compactor 102 according to various embodiments in a side or cross-sectional view and in a plan view.

A compactor 102 may be used as a functional assembly of an empty-container machine. An empty-container machine is also referred to as empty-container return machine (Reverse Vending Machine, RVS). The empty-container machine is typically connected to a deposit system, though may also be used in other sectors.

In order, for example, to make it easier for returned empty containers 104 to be transported away, a compactor 102 may be configured to compact these empty containers 104. For example, the empty containers 104 which are fed to an empty-container machine, for example if they are suitable for compacting, may be compacted by means of a compactor 102 or in a distributed manner by means of multiple compactors 102. The space requirement of the empty containers 104 is clearly reduced in the process. For this purpose, the empty containers 104 may be deformed, for example pressed, comminuted, etc. The empty containers 104 may clearly be for example broken, cut, etc. into a multiplicity of pieces. Alternatively or in addition, the empty containers 104 may for example be pushed into a flat shape. For example, glass containers can be broken up, for example by means of a glass crusher. Plastics containers may for example be comminuted by means of a cutting tool. Other deformation methods may also be used.

Compacted empty containers $104k$ may be collected $101s$ in at least one collecting vessel 152 (for example a freight container). For this purpose, the collecting vessel 152 may for example be arranged under the compactor 102. For example, the compactor 102 may be arranged on a framework, such that a space for receiving a collecting vessel 152 or multiple collecting vessels 152 is provided below the compactor 102.

In this context, empty containers 104 can be understood for example as vessels, for example in the form of emptied sales packagings, sales containers, etc. Empty containers 104 may for example include the following: single-use bottles, single-use deposit bottles, beverage cans, reusable bottles, etc. An empty-container machine may for example be part of an empty-container return chain, which supplies the empty containers 104 for reuse or recycling (e.g. for raw material recovery).

The compactor 102 may have a compactor unit 112 (clearly a device for reducing the space requirement), by means of which empty containers 104 can be compacted. The compactor unit 112 may have at least one compactor roller $112w$ (for example a single compactor roller or multiple compactor rollers rotating in opposite directions) and a drive $112a$ (for example an electric motor) for driving the compactor roller $112w$. Furthermore, the compactor 102 may have a feed device $112t$ for feeding the empty containers 104 in the direction $101t$ of the compactor roller $112w$.

The feed device $112t$ may for example be a driven transport device. Alternatively or in addition to this, the feed device $112t$ may provide a predefined path on which the empty containers 104 are moved, for example owing to the force of gravity. In this case, the feed device $112t$ may clearly have a chute. Alternatively to this, the compactor 102 may be configured such that the empty containers 104 can fall into it, for example in free fall.

The feed device $112t$ may for example have a belt conveyor, a belt-link conveyor, a chain conveyor, a roller conveyor, etc. as a driven transport device. A belt conveyor may for example have at least one transport belt on which the empty containers 104 are transported. The at least one transport belt may for example be supported by means of multiple transport rollers (also referred to as carrier rollers). The at least one transport belt may be mounted in endlessly circulating fashion. A belt-link conveyor may have at least one belt-link belt. The at least one belt-link belt may be mounted in endlessly circulating fashion. The individual belt links of a belt-link belt may be detachably connected by means of connecting elements. A roller conveyor may for example have a multiplicity of transport rollers which are arranged such that they provide a transport surface on which the empty containers 104 can be transported. It is alternatively or additionally also possible to use other types of conveyors which are suitable for transporting the empty containers 104.

The feed device $112t$ may for example have a paddle wheel. The paddle wheel may for example assist the feeding and/or compacting of the empty containers 104.

Figure 2A:
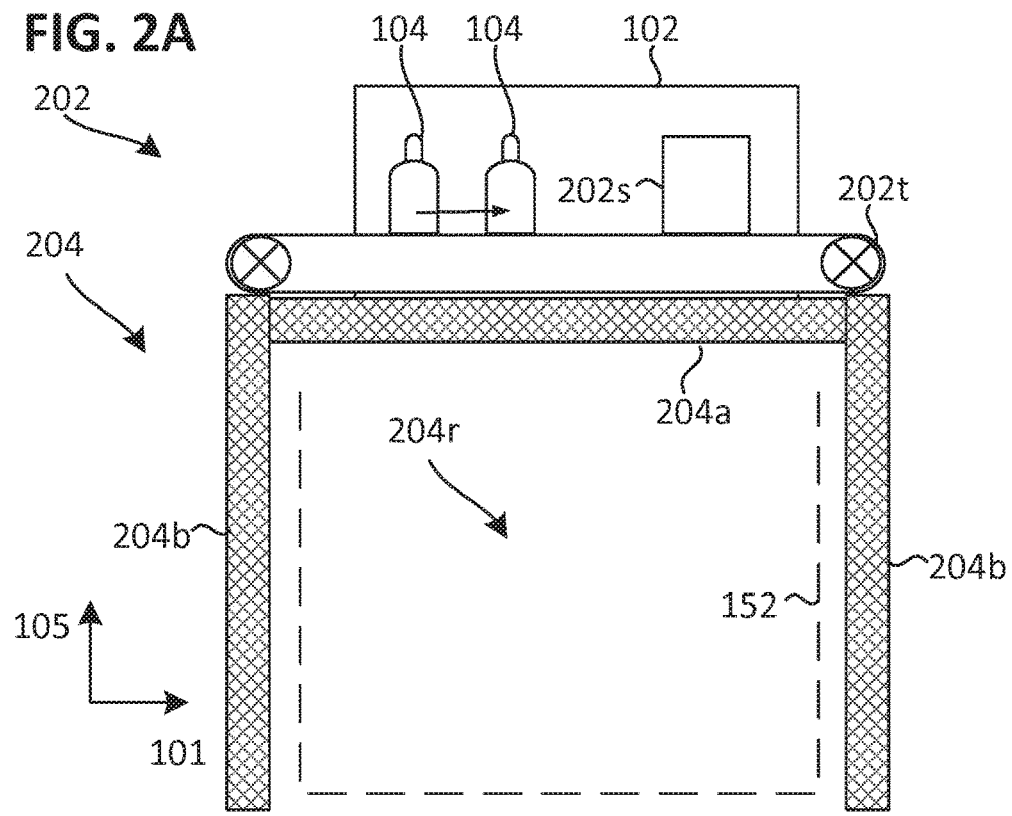
FIG. 2A and FIG. 2B show a compactor arrangement in various schematic illustrations, according to various embodiments.
Figure 2B:
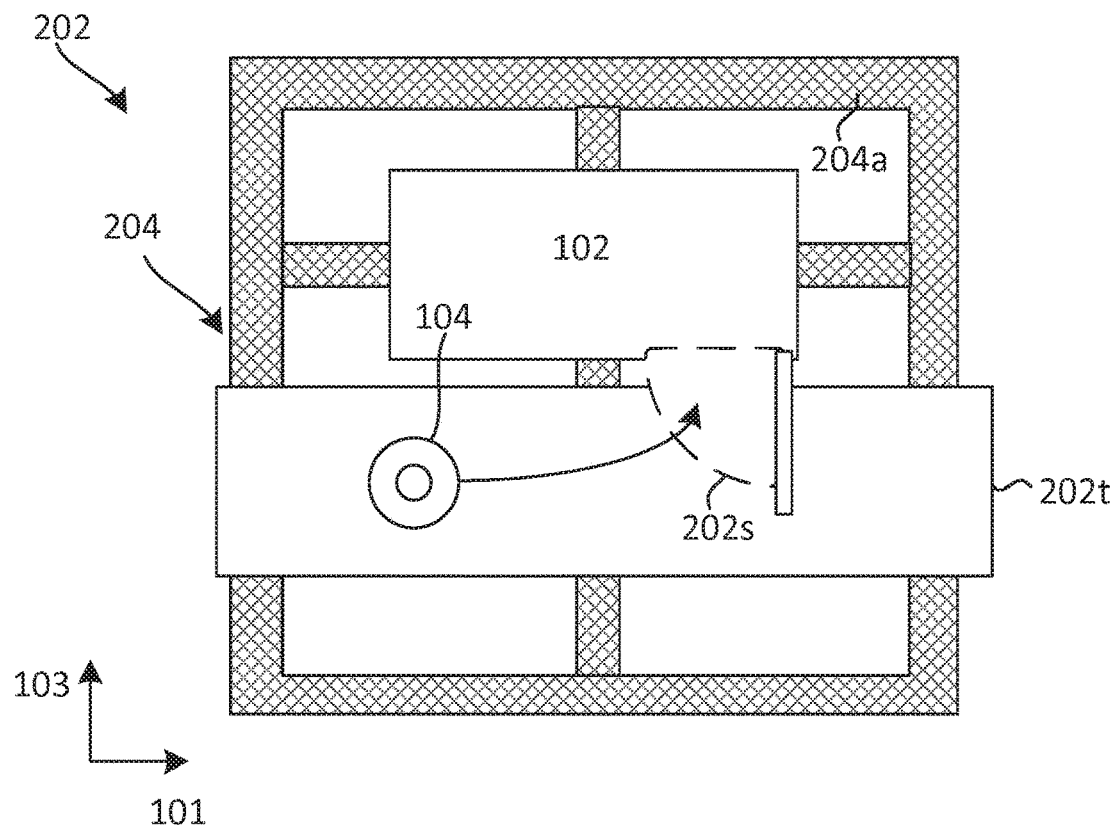

FIG. 2A and FIG. 2B illustrate a compactor arrangement 202 according to various embodiments in various views. The compactor arrangement 202 may for example have a framework arrangement 204. Furthermore, the compactor arrangement 202 may have a compactor 102 or multiple compactors 102. The compactor 102 of the compactor arrangement 202 may for example be configured in a similar or identical manner to that described above, and vice versa.

The compactor arrangement 202 may have further assemblies in addition to the compactor 102. The further assemblies may for example be configured to assist the operation of the compactor 102 and/or to integrate the compactor 102 into the sequence chain of an empty-container machine.

The framework arrangement 204 may for example have at least one support framework 204a. The compactor 102 may for example be fastened to the at least one support framework 204a. For example, the framework arrangement 204 may support the compactor 102 at a working height. It is thus for example possible for a collecting vessel 152 (for example a container or another large-capacity vessel) to be arranged under the compactor 102.

The framework arrangement 204 may furthermore have multiple support legs 204b. The support legs 204b may be arranged such that a first receiving space 204r for receiving a collecting vessel 152 is provided between them. It is thus possible, for example, for the collecting vessel 152 to be exchanged in a simple manner.

The compactor arrangement 202 may for example have an empty-container transport device 202t. The empty-container transport device 202t may for example be configured to lead the empty containers 104 to and/or past the compactor 102. The empty-container transport device 202t may for example be part of a transport path along which the empty containers 104 are transported. The empty-container transport device 202t may for example be a driven transport device, for example having at least one belt conveyor, at least one belt-link conveyor, at least one chain conveyor, or at least one roller conveyor.

The compactor arrangement 202 may for example have a selection device 202s. The selection device 202s may also be understood as a sorting device or part of a sorting device. It is thus possible for empty containers 104 that are led along the compactor 102 to be selected, for example for the selective feed of the empty containers 104 into the compactor 102. Here, the empty containers 104 may for example be classified; for example, a first class may be "compacting" and a second class may be "non-compacting". Use may also be made of additional or different classes; for example, the empty containers 104 may be classified according to color, material (for example glass, metal, plastics, etc.), condition (for example filling level, integrity), etc. A compactor arrangement 202 may for example select empty containers 104 which have a class assigned thereto (e.g. "compacting", e.g. "glass of a first color", "glass of a second color", "plastics of a first color", "plastics of a second color", etc.).

The selection device 202s may for example be configured to separate out, from a flow of empty containers which is led along the compactor 102 by means of the empty-container transport device 202t, that empty container 104 which has a class assigned to the compactor arrangement 202, and to feed said empty container to the compactor 102.

The selection device 202s may for example be configured to classify the empty containers 104. For example, the empty containers 104 may be classified by means of the selection device 202s and/or a suitable sensor arrangement which is linked to the selection device 202s, for example according to "compactable", "non-compactable", container type, return type, material, color, etc.

For example, the selection of the empty containers 104 may be performed in stages; for example, empty containers 104 classified as "compactable" may be further subclassified according to color, material, etc.

The classification of the empty containers 104 or a detection of the class of the empty containers 104 may alternatively or additionally take place by way of a separate classification means. This may for example be arranged at the entrance of an empty-container machine (see the following figures).

Figure 3A:
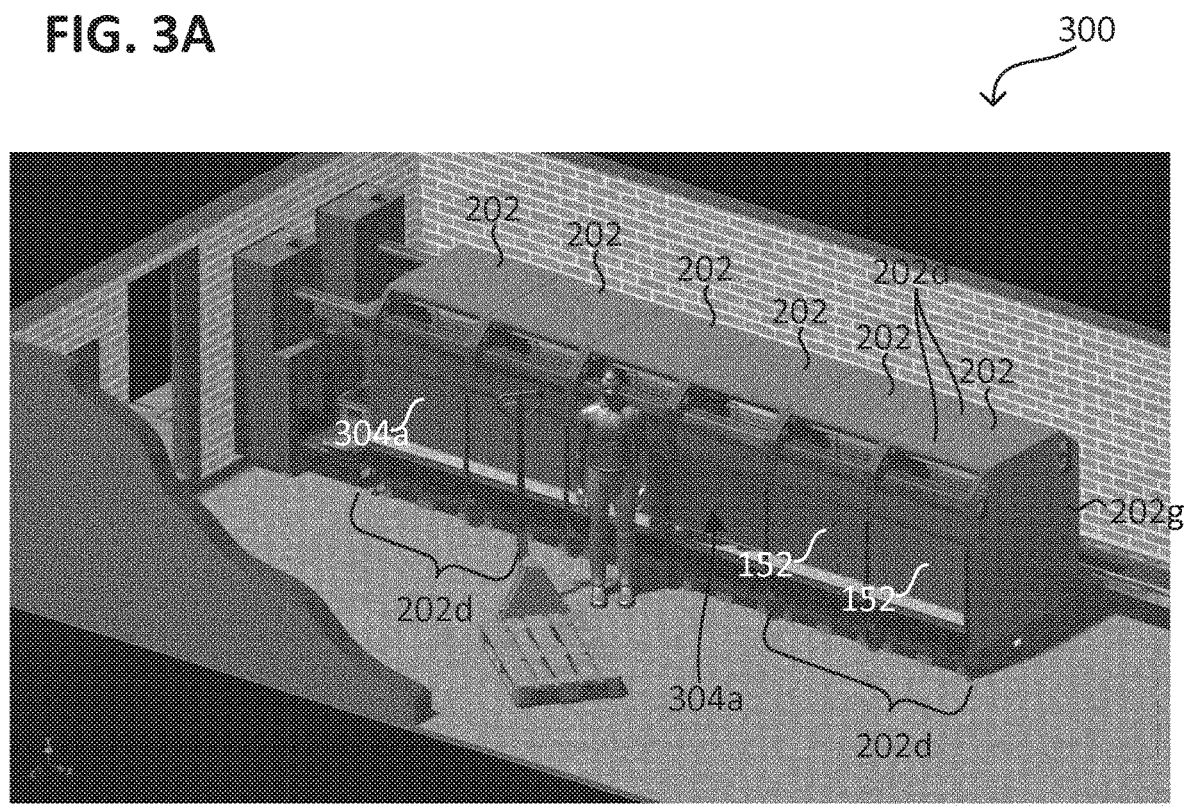
FIG. 3A and FIG. 3B show a compactor means in a schematic illustration, according to various embodiments.

The compactor arrangement 202 may have a housing (see for example the housing 202g in FIG. 3A). The compactor 102 and the empty-container transport device 202t may for example be arranged at least partially in the housing. The housing may have at least one first opening through which the empty containers 104 can be fed to the compactor arrangement 202 (e.g. received by means of the empty-container transport device 202t), for example along the transport path.

Furthermore, the housing may have a second opening. For example, the non-selected empty containers 104, which are transported past the compactor 102, may be discharged through the second opening, for example along the transport path.

Figure 3B:
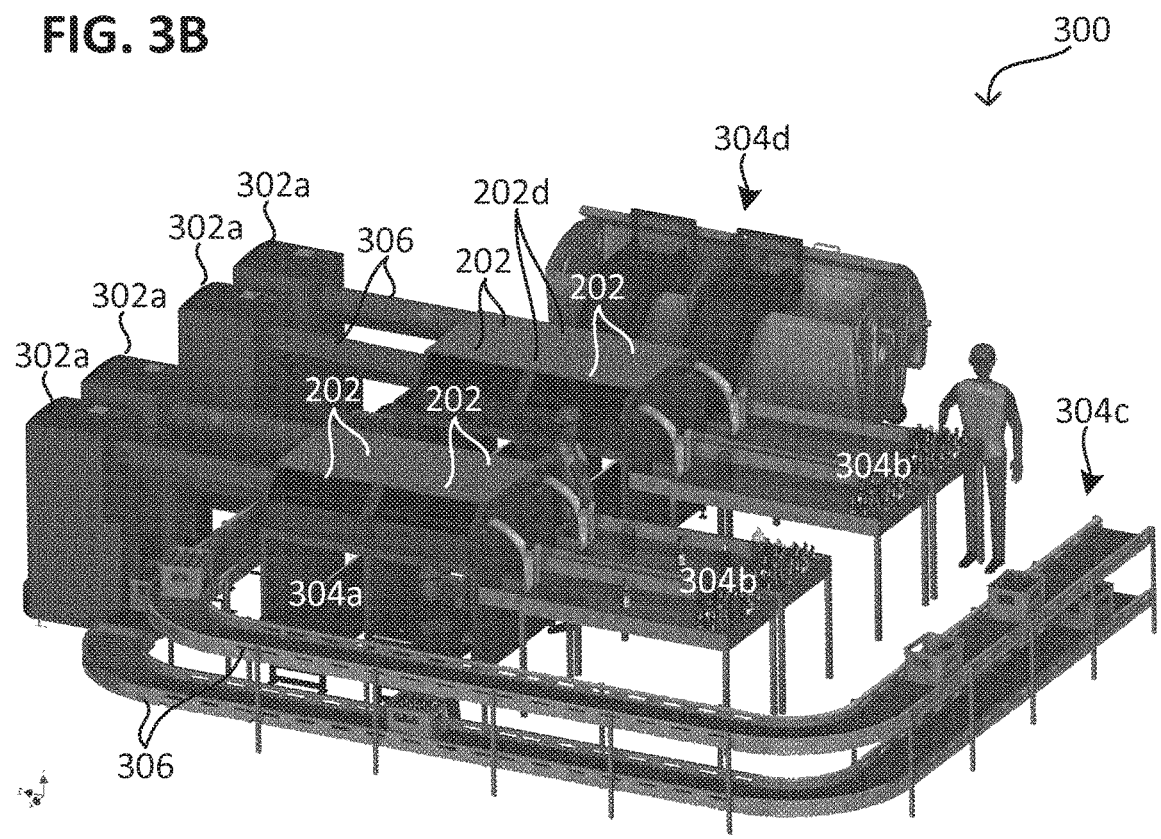

FIG. 3A and FIG. 3B each illustrate a compactor means 300 (also referred to as an empty-container return system or empty-container return machine) in a schematic perspective view, according to various embodiments.

The compactor means 300 may for example be configured to efficiently sort, compact, etc. the empty containers 104. For this purpose, a sequence chain for the sorting, compacting, etc. may be provided in conjunction with multiple compactor arrangements. The compactor arrangements of the compactor means 300 may for example be configured as described above with reference to the compactor arrangement 202.

The sequence chain of the compactor means 300 may, at the start 302a thereof, comprise for example a check of the empty container 104 to determine its eligibility for return. For example, various features of the empty container 104 (such as empty container type, weight, packaging type, barcode information, etc.) may be acquired for the check. The empty containers 104 classified as eligible for return can then be received by the compactor means 300 and fed to the sequence chain.

For example, multiple compactor arrangements 202 may be set up in series (that is to say along a common transport path) in the sequence chain. The multiple compactor arrangements 202 may for example perform compacting according to the classification, for example as described above.

Alternatively or in addition, the multiple compactor arrangements 202 may, in pairs (for example two first compactor arrangements and/or two second compactor arrangements), form a double module 202d, the compactor arrangements 202 of which compact the same class (also referred to as category). For example, one compactor arrangement 202 of the double module 202d can be serviced while the other compactor arrangement 202 of the double module 202d maintains operation. Multiple double modules 202d may be arranged in series (for example "back-to-back") or parallel to one another (that is to say in different transport paths). The double module 202d may for example have two compactors 102. These may be arranged in a common housing 202g or in separate housings 202g.

At one end, the sequence chain may have a receiving space 304a (for example with a collecting vessel 152 therein) for receiving compacted empty containers 104k. At another end, the sequence chain may (in addition or as an alternative to this) have at least one further receiving space 304b, for example for individual empty containers (e.g.

reusable empty containers or glass bottles) which are not to be compacted. Furthermore, at another end, the sequence chain may (in addition to or as an alternative to this) have a further receiving space 304c, for example for empty-container crates. Furthermore, at another end, the sequence chain may (in addition to or as an alternative to this) have a further receiving space 304d, for example for non-recyclable empty containers 104 (e.g. empty containers to be disposed of).

One end or multiple ends of the sequence chain may for example be connected by means of a transport system. The transport system may for example have multiple transport paths 306, and/or a selection may be performed at the points at which it branches (that is to say two transport paths adjoin one another).

Figure 4A:
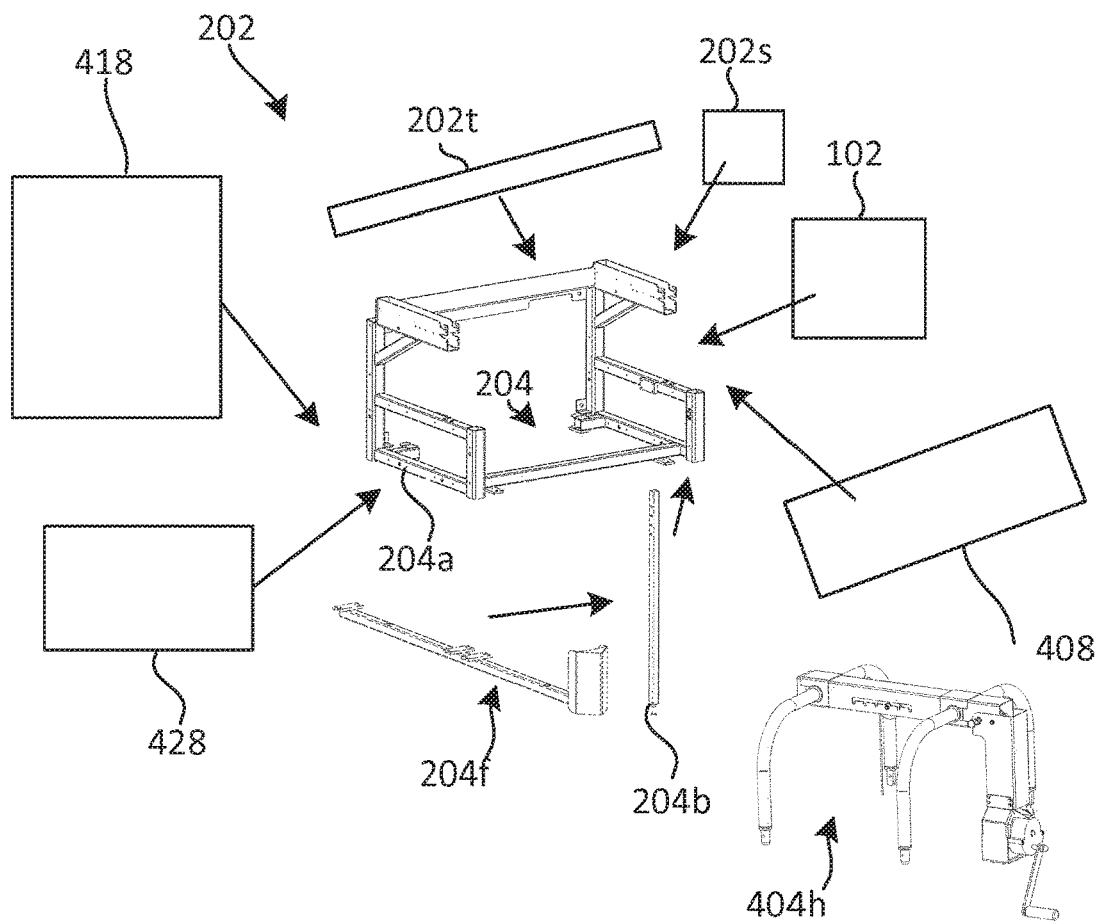
FIG. 4A to FIG. 4F each show various components of a compactor means in a schematic illustration, according to various embodiments.

FIG. 4A illustrates various components of a compactor arrangement 202, according to various embodiments. The compactor arrangement 202 may be designed in a similar or identical manner to that described above, and vice versa.

The compactor arrangement 202 may for example have at least one compactor 102 which may be designed in a similar or identical manner to that described above, and vice versa.

The compactor arrangement 202 may for example have at least one framework arrangement 204 which may be designed in a similar or identical manner to that described above, and vice versa. The framework arrangement 204 may for example have a support framework 204a which clearly serves as a central element for the installation of the components of the compactor arrangement 202 and/or for the setting-up of the compactor arrangement 202. The framework arrangement 204 may furthermore have, for example, support legs 204b by means of which the support framework 204a can be supported. Furthermore, the framework arrangement 204 may for example have a foot assembly 204f. The foot assembly 204f may have a ram guard and/or a ground anchor. The ram guard itself may for example be designed to be exchangeable, because it should be exchanged in the event of damage. The ground anchor may for example be provided with at least one bore which can be used for the fastening to the ground.

The framework arrangement 204 may be configured such that the support framework 204a can be transported by means of a lifting truck, can be placed on the ground, and can be raised to a desired height by means of the support legs 204b. A lifting device 404h may be used to raise the support framework 204a. It is also possible for multiple support frameworks 204a to be connected to one another and to be raised simultaneously. When the support framework 204a is raised, some or all of the further components of the compactor arrangement 202 may already have been installed on the support framework 204a. Furthermore, the support framework 204a can also be lowered again. The support framework 204a may be configured such that some or all of the further components of the compactor arrangement 202 which have been installed on the support framework 204a (for example the compactor 102) can be uninstalled or exchanged without the support framework 204a being lowered.

Figure 4B:
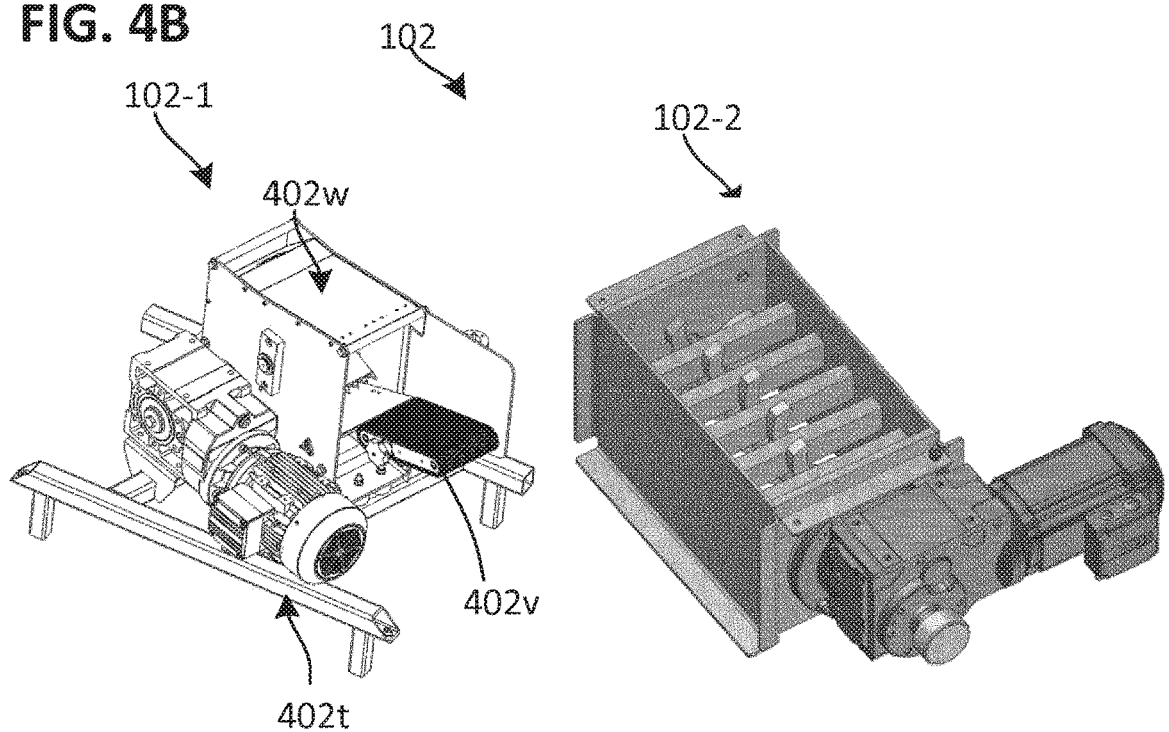

FIG. 4B illustrates, by way of example, a compactor 102 in two different embodiments 102-1, 102-2. The compactor 102 may for example be configured in a similar or identical manner to that described above, and vice versa.

For example, in a first embodiment 102-1, the compactor 102 may have a cutting unit 402w, for example for comminuting empty containers 104 made of plastics. By means of a preliminary belt assembly 402v, for example, the empty containers 104 can be led in the direction of the cutting unit 402w. Furthermore, in a second embodiment 102-2, the compactor 102 may have a glass crusher, for example for comminuting empty containers 104 composed of glass.

The compactor 102 may for example be installed on a support frame 402t. The support frame 402t may for example be configured to match the support framework 204a of the framework arrangement 204 (or clearly understood as part of the framework arrangement 204) for the installation of the compactor 102 on the support framework 204a (see for example FIG. 5A to FIG. 5C). For example, the compactor 102 can be raised into the support framework 204a from below by means of the support frame 402t and detachably fastened to said support framework. Furthermore, the support frame 402t can be detached from the support framework 204a and the compactor 102 can be lowered out of the support framework 204a by means of the support frame 402t. The lifting device 404h, for example, may be used for the raising and/or lowering of the compactor 102.

The compactor arrangement 202 may for example have at least one empty-container transport device 202t, which may be configured in a similar or identical manner to that described above and vice versa.

Figure 4C:
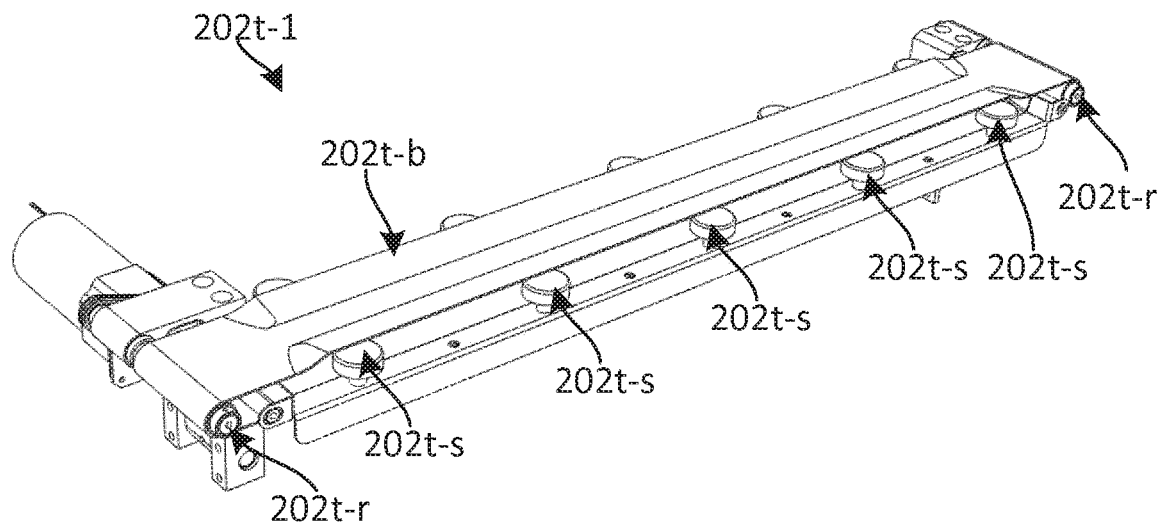
Figure 4C:
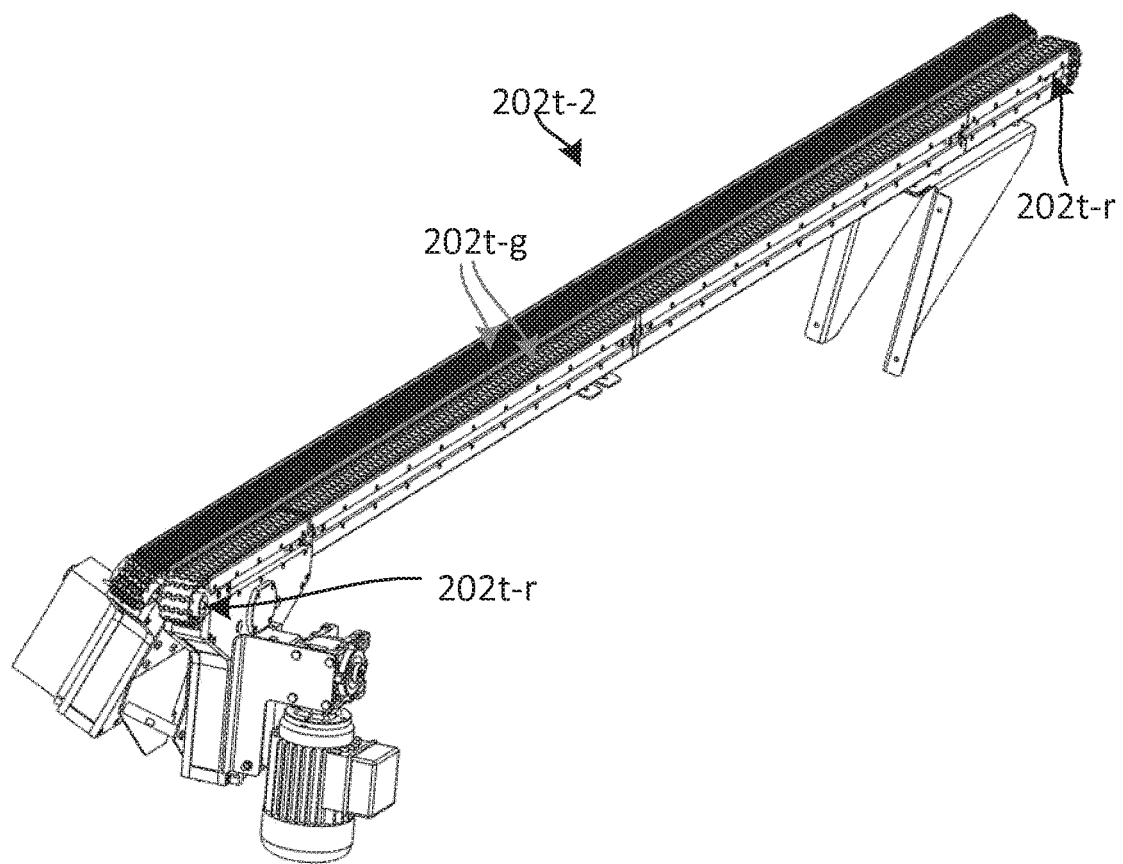

FIG. 4C illustrates, by way of example, an empty-container transport device 202t in two different embodiments 202t-1, 202t-2. The empty-container transport device 202t may for example be configured in a similar or identical manner to that described above, and vice versa.

In a first embodiment 202t-1, the empty-container transport device 202t may have a transport belt 202t-b. The empty-container transport device 202t may clearly be configured as a belt conveyor 202t-1. The transport belt 202t-b may be mounted in endlessly circulating fashion between at least two belt rollers 202t-r. The transport belt 202t-b can be correspondingly tensioned by means of the belt rollers 202t-r. Furthermore, support arrangements 202t-s may be used to camber the transport belt 202t-b. The respective support arrangement 202t-s may for example have a support roller and a rotary bearing, wherein the support roller is mounted so as to be rotatable about an axis of rotation by means of the rotary bearing. Here, the support roller may have a lateral surface on which the transport belt rests at least partially. The lateral surface may for example be oriented obliquely with respect to the axis of rotation.

In a second embodiment 202t-2, the empty-container transport device 202t may for example have two belt-link belts 202t-g. The empty-container transport device 202t may clearly be designed as a belt-link conveyor 202t-2. The belt-link belts 202t-g may be arranged in a V-shape. The respective belt-link belt 202t-g may be mounted in endlessly circulating fashion between at least two belt rollers 202t-r. The respective belt-link belt 202t-g may have a multiplicity of belt links which are mechanically connected to one another (for example by means of bolts). Here, the outwardly exposed side of the belt-link belt 202t-g (clearly the side that can come into contact with the empty containers 104) may have a rubber coating.

In an analogous manner, the preliminary belt assembly 402v of the compactor 102 may be configured as a belt conveyor or belt-link conveyor.

The compactor arrangement 202 may for example have at least one selection device 202s which may be designed in a similar or identical manner to that described above, and vice versa.

Figure 4D:
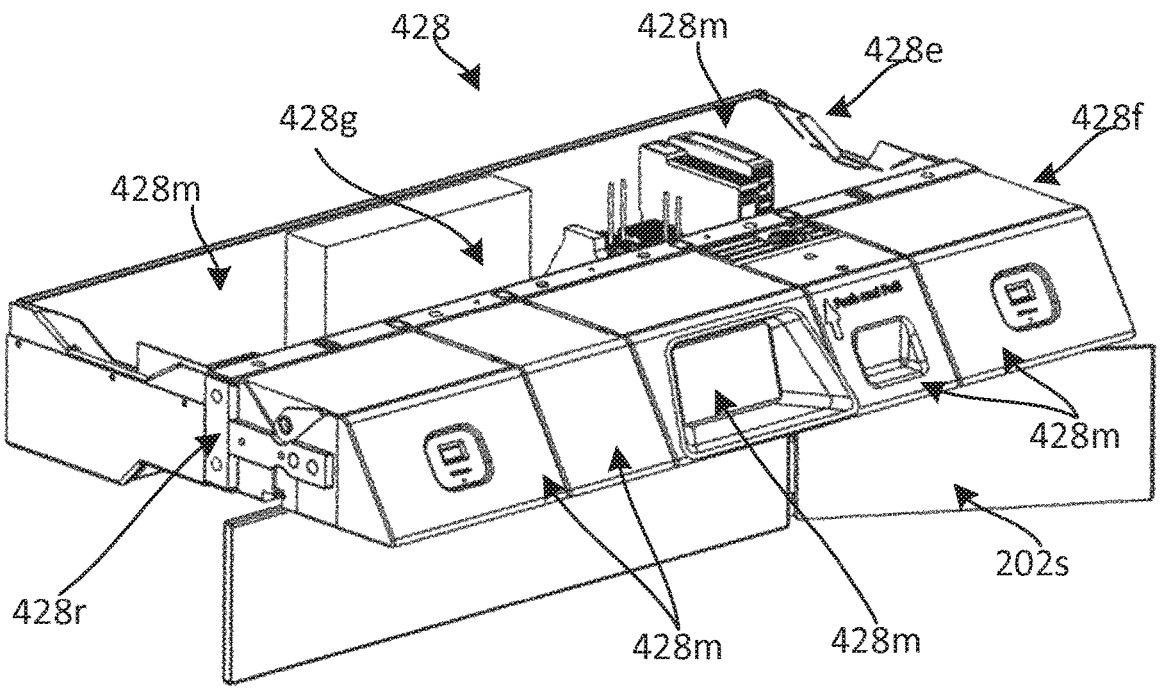

The compactor arrangement 202 may for example have at least one electrical assembly 428, as illustrated for example in a schematic view in FIG. 4D.

The electrical assembly 428 may for example have electrical and electromechanical components for the operation of the compactor arrangement 202, for example for the operation of the compactor 102, of the empty-container transport device 202t, of the preliminary belt assembly 402v, of the selection device 202s, etc. Here, operation may be understood to mean open-loop control, closed-loop control and/or a supply of electrical energy.

The electrical assembly 428 may for example be arranged on the support framework 204a. The electrical assembly 428 may for example be of modular design and have a multiplicity of modules 428m. The modules 428m may for example have one or more electronic modules, one or more electromechanical modules, etc. The modules 428m of the electrical assembly 428 may be detachably (for example pluggably) mounted by means of a common bearing arrangement 428r (e.g. of a frame, etc.). The common bearing arrangement 428r may for example be designed to be movable; for example, it may be configured to be displaceable and/or pivotable. As an alternative to this, the common bearing arrangement 428r may be installed in a static manner on the support framework 204a.

In some configurations, the selection device 202s may be configured, for example, as a module 428m of the electrical assembly 428. The selection device 202s may for example have a pivotably mounted flap. The pivotably mounted flap may be configured such that, in a first position, it leads empty containers 104 from the empty-container transport device 202t to the compactor 102, said empty containers clearly being selected, and in a second position leaves the empty containers 104 on the empty-container transport device 202t.

The modules 428m of the electrical assembly 428 may for example be configured so as to be easily accessible such that they can be exchanged, for example, by a user.

The electrical assembly 428 may for example have multiple supply modules which are designed, for example, as electrical boxes 428e. For example, an electrical box may be configured to provide a high-voltage power supply. Furthermore, a further electrical box may be configured to provide control functions, for example in the case of a low voltage, for example 12 V, 24 V, etc. The control functions may be implemented by means of a correspondingly configured control electronics. The electrical boxes 428e may for example be configured and mounted so as to be removable (for example upwards). This means that they can be exchanged if necessary by means of a small number of handling operations. Furthermore, for example, a free space 428g may be maintained for access to the cutting unit from above.

Multiple function modules of the electrical assembly 428 may be configured as a front assembly 428f (see function module arrangement 1002 in FIGS. 10A to 11F). The front assembly 428f may be connected to the electrical boxes 428e by means of an electrical interface (for example a cabling bridge). The function modules of the front assembly 428f may be supplied with electrical power by means of the electrical power supply installed in the electrical boxes 428e. Furthermore, the function modules of the front assembly 428f may for example be implemented by means of the control electronics installed in the electrical boxes 428e, by means of at least one processor. The control electronics can generate predefined control commands and/or control processes as required and be of correspondingly powerful design; for example, an application-specific integrated circuit (ASIC) or a computer system (e.g. a system on a chip, SoC) may be used to implement the control.

The compactor arrangement 202 may for example have multiple covers 408, 418. The covers 408, 418 may for example form part of a housing (also referred to as an enclosure) which houses, at least in certain sections, the components of the compactor arrangement 202. The covers 408, 418 can for example serve to protect components of the compactor arrangement 202 and/or to shield components that pose a risk to a user (e.g. a high-current component, a cutting unit, moving components of a transport device, etc.).

The enclosure of the compactor arrangement 202 may for example be divided into an upper cover 408 (for example an upper flap) and a lower cover 418 (for example a lower flap, also referred to as a container flap), see FIG. 4A. The upper cover 408 may for example cover the transport path (for example, at least in certain sections, the empty-container transport device 202t of the compactor arrangement 202). The lower cover 418 may for example cover a part of the support framework 204a and a receiving space below the support framework 204a, when the latter is raised, for receiving a collecting vessel, as described by way of example above.

Figure 4E:
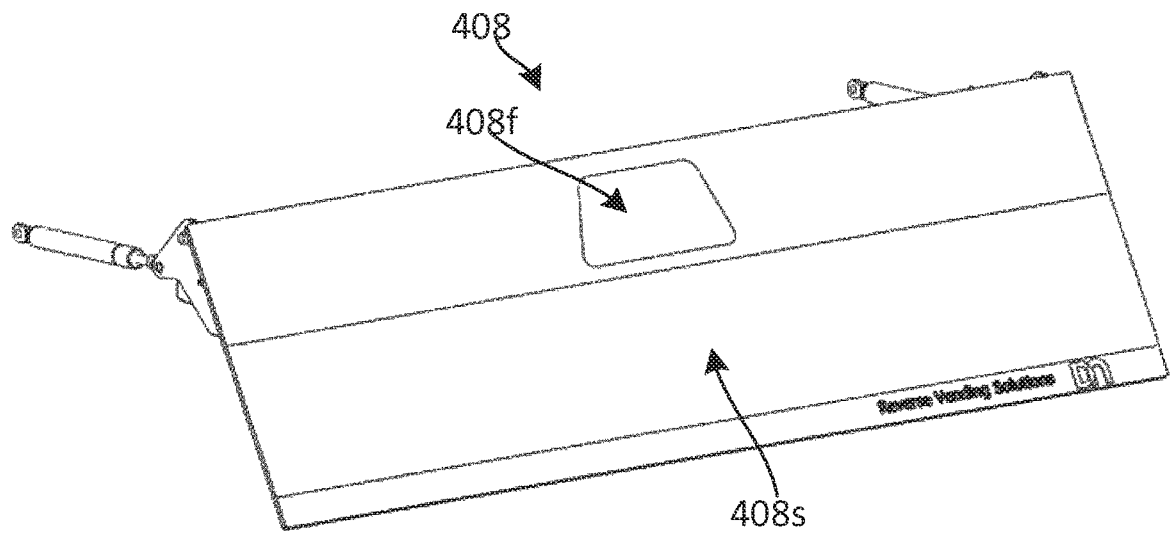

FIG. 4E illustrates, by way of example, an upper cover 408 in an exemplary view.

The upper cover 408 may for example be provided to match the electrical assembly 428 in order to ensure, for example, easy access to the modules 428m of the electrical assembly 428, for example for the exchange of one or more of the modules 428m. For this purpose, the upper cover 408 may be movably mounted such that it can be opened and closed.

Furthermore, the upper cover 408 may be configured such that at least one display element of a module 428m of the front assembly 428f is visible to a user. For example, the upper cover 408 may have at least one viewing window 408f through which a display element of a module 428m of the front assembly 428f is visible to a user.

Furthermore, the upper cover 408 may be configured such that at least one input element of the modules 428m of the front assembly 428f is accessible to a user.

Furthermore, the upper cover 408 may be configured such that the empty containers 104 being transported in the compactor arrangement 202 by means of the empty-container transport device 202t are visible to a user. For example, the upper cover 408 may have at least one further viewing window 408s through which empty containers being transported in the compactor arrangement 202 by means of the empty-container transport device 202t are visible to a user.

The upper cover 408 may for example be designed as an upper flap in such a way that it opens automatically. The opening may for example take place by means of gesture control or by means of some other form of control, for example a button, a touch sensor, etc. The opening mechanism of the upper flap may be implemented for example mechanically by means of two gas pressure springs or in some other suitable form. In the corresponding closed position, the upper flap may be held by means of a catch bolt lock. The upper cover 408 may be provided so as to be removable and/or exchangeable without tools.

Figure 4F:
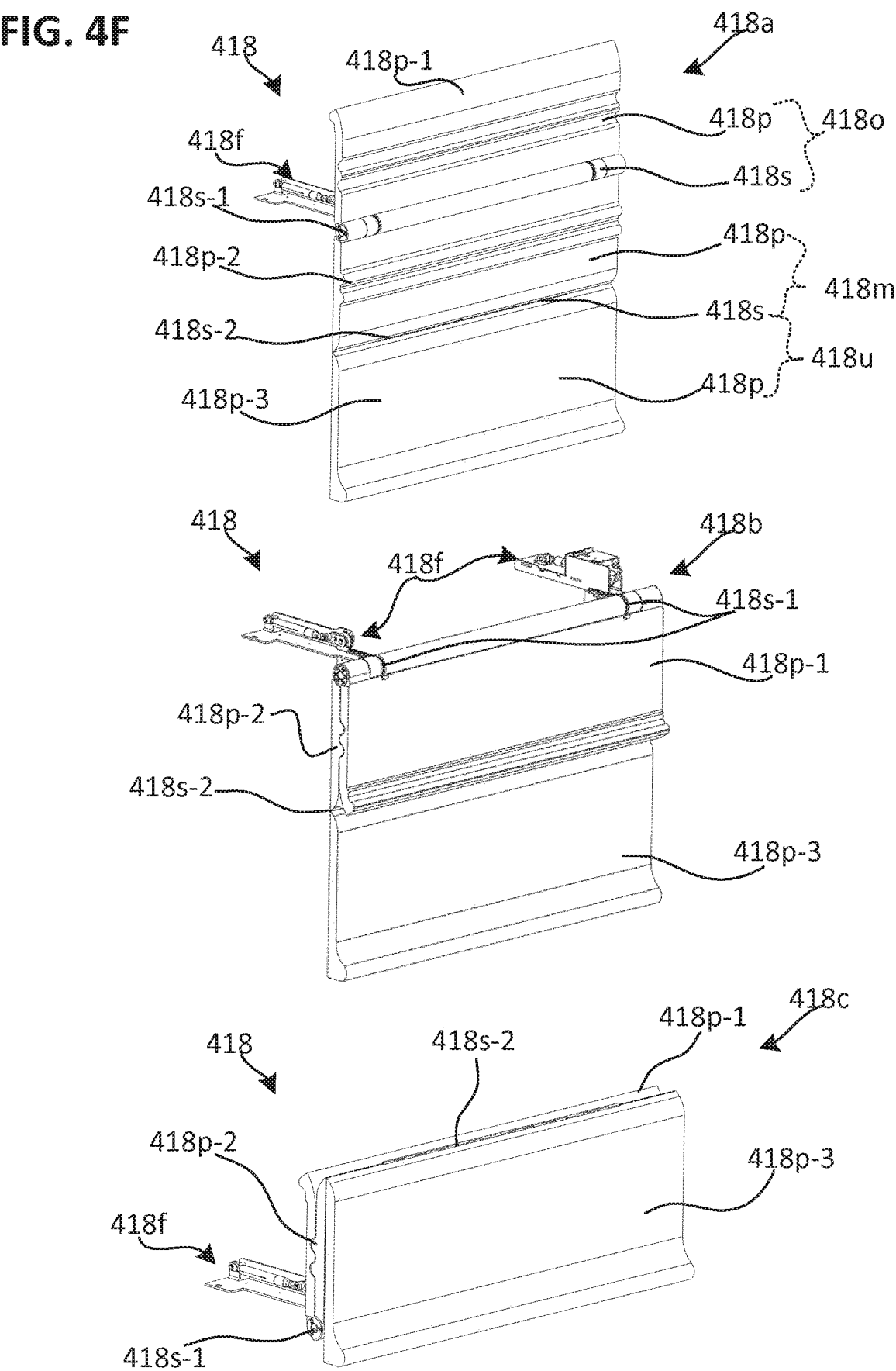

FIG. 4F illustrates, for example, a lower cover 418 in different positions 418a, 418b, 418c in an exemplary view, according to various embodiments.

The lower cover 418 may be configured, for example, as a flap arrangement 418 such that it can be moved (e.g. pivoted or folded) into various positions 418a, 418b, 418c by means of a multi-part folding mechanism.

According to various embodiments, the lower cover 418 may be a multi-part (e.g. 3-part) flap arrangement 418, as described in detail below.

As is shown by way of example in FIG. 4F, the flap arrangement 418 may have multiple cover plates 418p, for example a first cover plate 418p-1, a second cover plate 418p-2 and a third cover plate 418p-3. The multiple cover plates 418p can be moved into different positions 418a, 418b, 418c for example by means of multiple hinge arrangements 418s, for example a first hinge arrangement 418s-1 and a second hinge arrangement 418s-2.

Here, the flap arrangement 418 may have at least one fixing arrangement 418f. The fixing arrangement 418f can for example fix the flap arrangement 418 in a closed position 418a, in a first open position 418b and/or in a second open position 418c. For the fixing of the flap arrangement 418 in the respective position, at least one of the cover plates 418p can be held static by the fixing arrangement 418f.

In the closed position 418a, the second cover plate 418p-2 and the third cover plate 418p-3 can be mounted in a stable manner owing to the force of gravity (clearly these can be jointly suspended on the first hinge arrangement 418s-1).

The three-part flap arrangement 418 can clearly be divided into two parts, that is to say for example may clearly have three flaps 418o, 418m, 418u.

The first (for example upper) cover plate 418p-1 may for example form an upper pivoting flap 418o with the associated first hinge arrangement 418s-1. The upper pivoting flap 418o may for example be configured such that it can be pivoted through approximately 180°, for example when the flap arrangement 418 is to be moved from the closed position 418a into the first open position 418b and vice versa.

The upper pivoting flap 418o may for example be held in the closed position 418a by means of the fixing arrangement 418f. The upper pivoting flap 418o may for example be detachably fixed on the support framework 204a of the framework arrangement 204, see for example FIGS. 5A to 5C.

The upper pivoting flap 418o of the flap arrangement 418 may for example be configured such that it can be opened (see first open position 418b) only when the upper cover 408 is already open.

As illustrated for example in FIG. 4F, the central cover plate 418p-2 with the associated second hinge arrangement 418s-2 may form a central pivoting flap 418m. The lower cover plate 418p-3 may for example, with the associated second hinge arrangement 418s-2, form a lower pivoting flap 418u.

In the closed position 418a, the pivoting flaps or cover plates 418 of the flap arrangement 418 may be arranged in a common plane. The pivoting flaps or cover plates 418 of the flap arrangement 418 then form a substantially closed surface.

In the first open position 418b, the central pivoting flap 418m and the lower pivoting flap 418u (or the second cover plate 418p-2 and the third cover plate 418p-3) of the flap arrangement 418 may be arranged in a common plane. These then form a substantially closed surface. In the first open position 418b, the upper pivoting flap 418o (or the first cover plate 418p-1) may be folded over the central pivoting flap 418m (or the second cover plate 418p-2).

In the second open position 418c, the upper pivoting flap 418o may be in the same position as in the closed position 418a. The central pivoting flap 418m and the lower pivoting flap 418u may be folded in oppositely to one another and pivoted upwards. In the second open position 418c, the three pivoting flaps (or cover plates 418) of the flap arrangement 418 may be arranged one above the other. There is thus a small space requirement during the pivoting movement. Furthermore, there is a small space requirement in the second open position 418c, such that, for example, in this position, the compactor arrangement 202 can be transported in a space-saving manner and at the same time can be easily installed (see FIG. 11).

The flap arrangement 418 may for example be configured such that it can be opened in a manually assisted manner or fully automatically. For this purpose, the flap arrangement 418 may have a suitable drive system.

The flap arrangement 418 may for example be configured such that the lower pivoting flap 418u moves automatically relative to the central pivoting flap 418m when the central pivoting flap 418m is moved. It may thus suffice, for example, to move the central pivoting flap 418m by means of an actuator in order to bring the flap arrangement 418 into the second open position 418c.

For example, a fully automatic opening and closing mechanism may be provided. As an alternative to this, a fully automatic opening mechanism and a manual closing mechanism, a manual opening mechanism and a fully automatic closing mechanism, or a manual opening and closing mechanism may be provided.

As described above by way of example, the upper cover 408 may be configured such that it can be opened fully automatically and/or closed fully automatically. Furthermore, the flap arrangement 418 may be configured such that it can be opened fully automatically and/or closed fully automatically.

Here, a compactor means 300, which for example has multiple compactor arrangements 202, may have a central controller (e.g. implemented in the electrical assembly 428, e.g. implemented in a control device external to the compactor arrangement, etc.) for the respective fully automatic opening and/or fully automatic closing of the lower flap arrangement 418 and/or of the upper cover 408. The respective movement for the opening and/or closing may be triggered by means of a sensor, for example on the basis of the recognition of a gesture by a user, an input by a user at a control panel, a switch, etc. Alternatively, the opening and/or closing may be performed in a time-controlled manner or automatically on the basis of a triggering event (e.g. an error signal, etc.).

According to various embodiments, the fixing arrangement 418f may have a mechanical holder, an electromechanical holder, a magnetic holder, an electromagnetic holder, etc.

As illustrated by way of example in FIG. 4F, a compactor arrangement 202, according to various embodiments, may have a flap arrangement 418. The flap arrangement 418 may be installed on the support framework 204a. For example, the first hinge arrangement 418s-1 may be fastened to the support framework 204a. The second hinge arrangement 418s-2 may for example movably connect only the second cover plate 418p-2 and the third cover plate 418p-3 to one another.

The multiple hinge arrangements 418s of the flap arrangement 418 may for example be configured such that their axes of rotation or pivot axes are oriented substantially parallel to one another.

The first hinge arrangement 418s-1 may for example be installed on a first end portion of the second cover plate 418p-2 and the second hinge arrangement 418s-2 may be installed on a second end portion of the second cover plate 418p-2 which is situated opposite the first end portion.

Figure 5A:
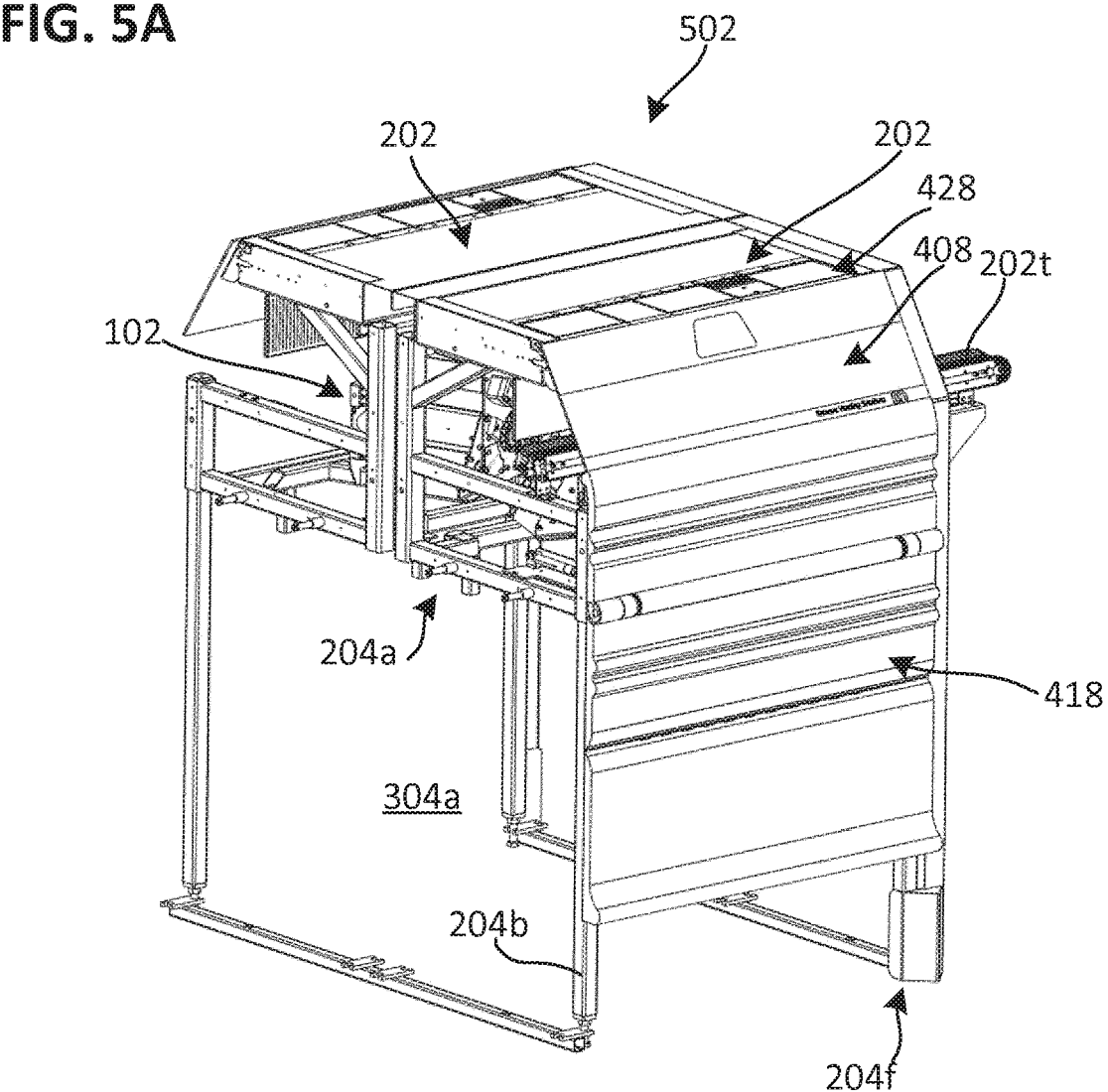

FIG. 5A to FIG. 5C each illustrate a compactor arrangement assembly 502 with multiple compactor arrangements 202 in various illustrations. The compactor arrangements 202 may for example be embodied as described above. The compactor arrangement assembly 502 may clearly be configured as a double module, as illustrated by way of example in FIGS. 5A and 5B.

Furthermore, the compactor arrangement assembly 502 may have multiple double modules, for example two double modules arranged in series, as illustrated by way of example in FIG. 5C. Other configurations, for example an individually set-up compactor arrangement 202, two individual compactor arrangements 202 arranged in series, etc. are likewise possible. For this purpose, the respective framework arrangement 204 may for example be correspondingly modified; for example, a single compactor arrangement 202 may be set up using four support legs 204b and a double module with two compactor arrangements 202 may be set up for example using at least four (e.g. four, six or eight) support legs 204b.

The respective double module may for example have two compactor arrangements 202 which are arranged back-to-back relative to one another. Thus, for example, two transport paths 306 are each accessible from mutually opposite sides of the double module. The transport paths 306 are formed by the respective empty-container transport devices 202t of the compactor arrangements 202.

By means of a respective selection device 202s, empty containers can be selectively led from the transport paths 306 into the respective compactor 102 of the compactor arrangement 202. After the empty containers have been comminuted, they may be collected in a collecting vessel which may be arranged below the respective compactor 102 in the receiving space 304a. For the exchange or introduction of the collecting vessel into the receiving space 304a and/or removal of the collecting vessel from the receiving space 304a, the flap arrangement 418 can be opened; for example, the flap arrangement 418 can be folded into the second open position 418c, as described above. Furthermore, the flap arrangement 418 may be opened for servicing and/or installation of the compactor 102, of the empty-container transport devices 202t, etc.; for example, the flap arrangement 418 may be folded into the first open position 418b, as described above.

As illustrated for example in FIG. 5A and FIG. 5B, the flap arrangement 418 may be configured such that the second cover plate 418p-2 and the third cover plate 418p-3 at least partially cover the receiving space 304a for receiving the collecting vessel when said flap arrangement is in the closed position 418a.

As illustrated for example in FIG. 5C, a common empty-container transport device 202t may extend through two mutually adjacent compactor arrangements 202. Furthermore, the empty-container transport device 202t may extend through an opening in the side wall of the housing 202g and be configured such that a distance from the compactor arrangement 202 to a further compactor arrangement 202 or to another transport system can be bridged.

Furthermore, further housing parts may be installed, for example lateral housing parts, upper housing parts, etc., as illustrated for example in FIG. 9C.

Figure 6:
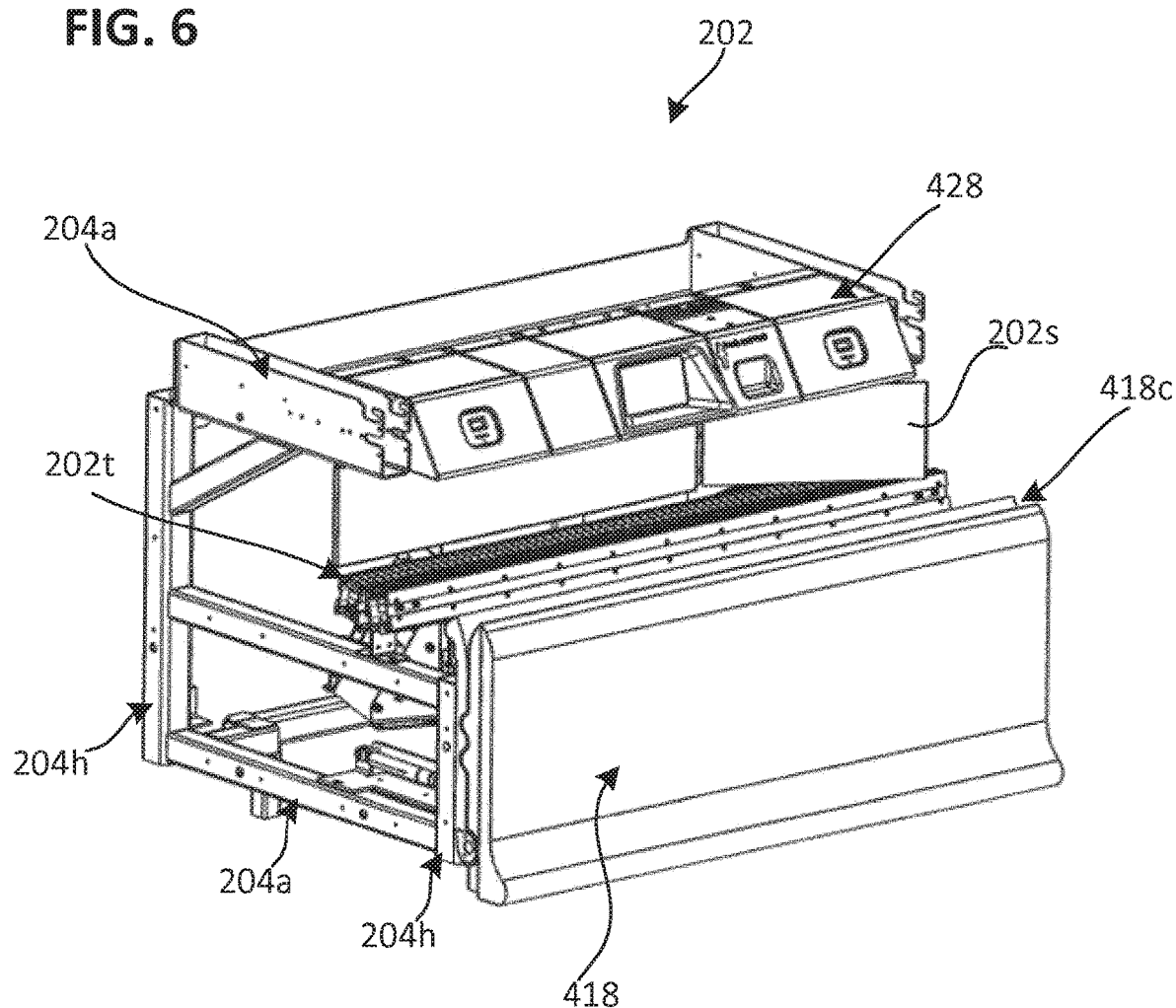
FIG. 6 shows a compactor arrangement in a schematic illustration, according to various embodiments.

FIG. 6 illustrates a compactor arrangement 202 in a schematic illustration, for example during transport, for example before being set up.

The compactor arrangement 202 may be of modular design, for example as described above. Owing to a modular design, in particular of the framework arrangement 204 and/or of the flap arrangement 418, the compactor arrangement 202 can be transported and set up in a simple manner. During transport, the compactor arrangement 202 can be reduced to a small volume by means of a small number of installation steps. In an analogous manner, the compactor arrangement 202 can be set up by means of a small number of installation steps.

As illustrated for example in FIG. 6, the flap arrangement 418, as described above, may be in the second open position 418c while the compactor arrangement 202 is transported to its set-up location and/or is transported away from its set-up location.

The cover plates 418 of the flap arrangement 418 can be held in this position by means of the fixing arrangement 418f or by means of a further fixing arrangement. Clearly, a fixing arrangement or multiple fixing arrangements may be configured for fixing the three cover plates 418 of the flap arrangement 418 in the second open position 418c.

In the second open position 418c, for example, a region of the support framework 204a in which the compactor 102 is arranged or can be received may be covered at least in certain sections by at least the first cover plate 418p-1. The electrical assembly 428 of the compactor arrangement 202 may for example be accessible irrespective of the position of the flap arrangement 418. The empty-container transport device 202t may for example be covered in certain sections; for example, direct access from the front may be prevented by means of the flap arrangement 418 when the latter is in the closed position 418a or in the second open position 408c but not prevented when the flap arrangement 418 is in the first open position 408b.

Owing to a modular design of the further components of the compactor arrangement 202, in particular of the electrical assembly 428, of the empty-container transport device 202t, of the compactor 102, etc., the compactor arrangement 202 can be serviced in a simple manner; for example, defective components can be easily exchanged, contaminated parts can be easily cleaned, etc.

Figure 7A:
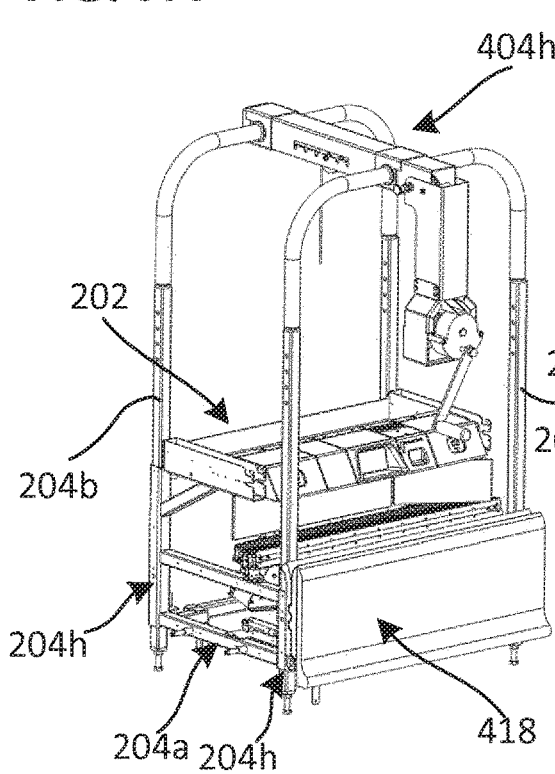
FIG. 7A to FIG. 7C show a compactor arrangement in various schematic illustrations, according to various embodiments.
Figure 7B:
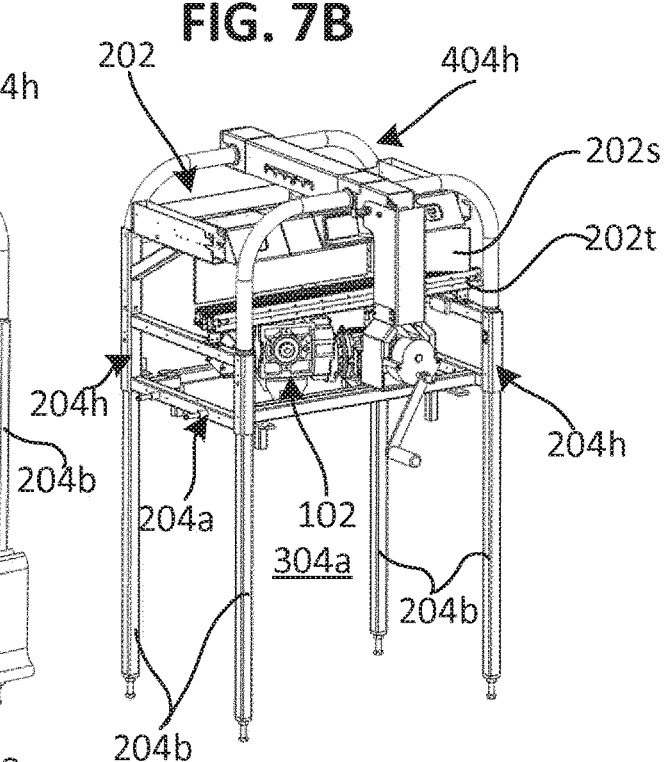
Figure 7C:
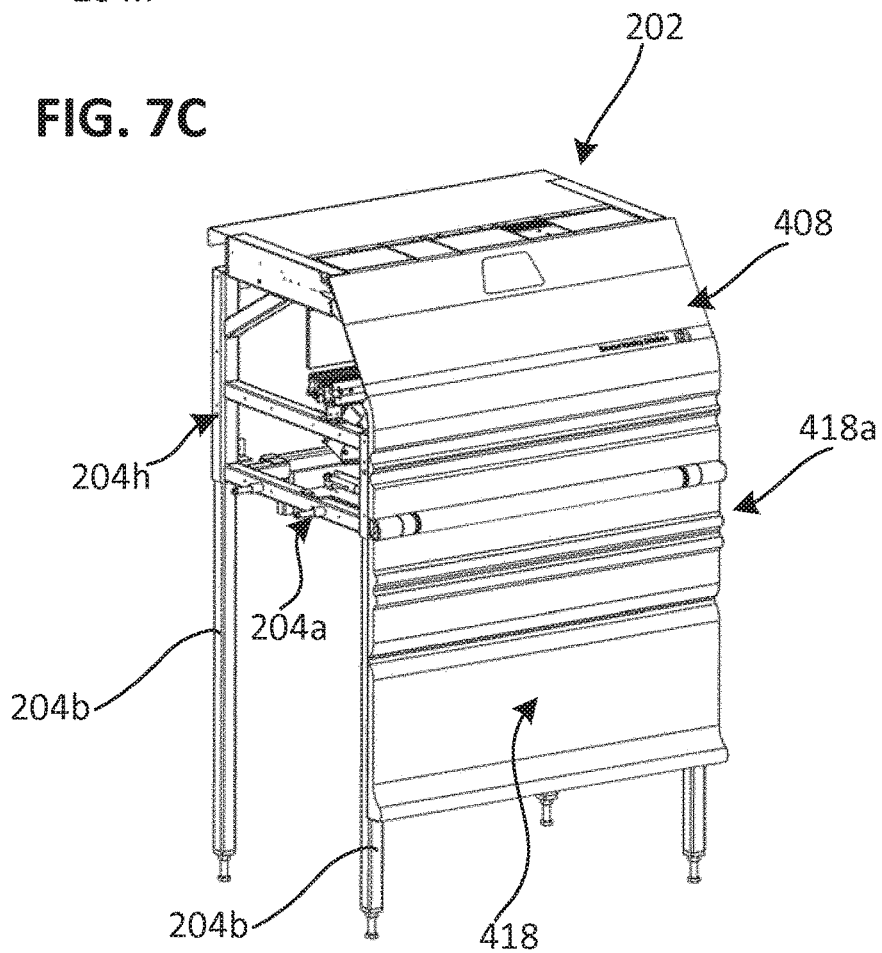

FIG. 7a to FIG. 7C illustrate a compactor arrangement 202 in various illustrations, for example during the setting-up or installation of the multiple compactor arrangements 202.

Figure 8A:
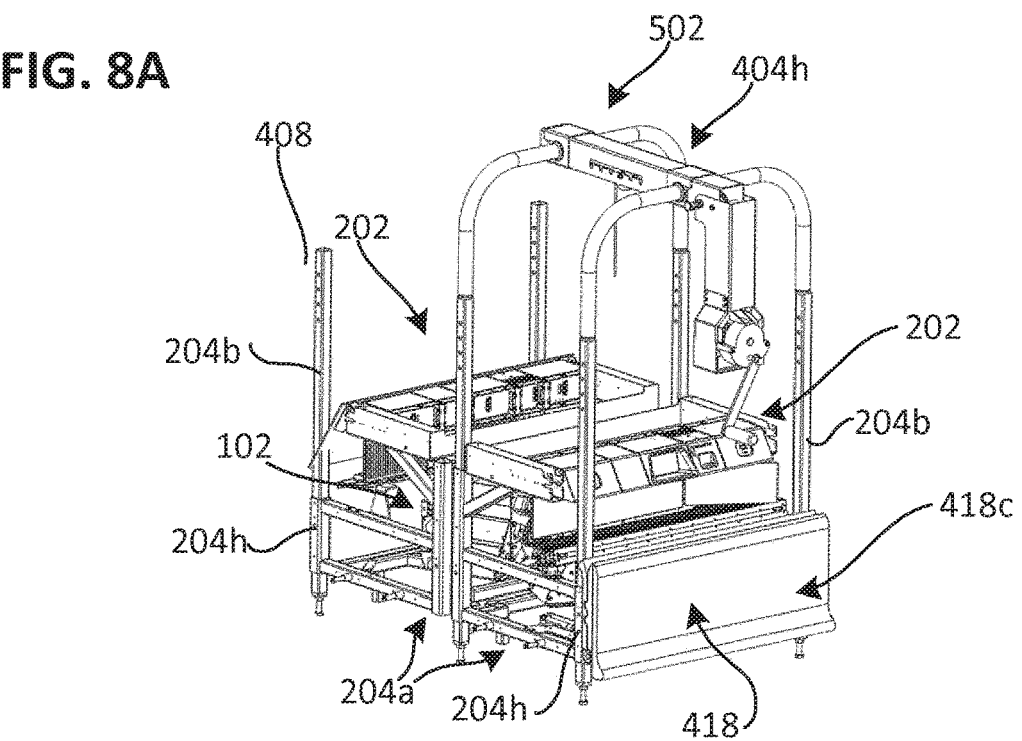
Figure 8B:
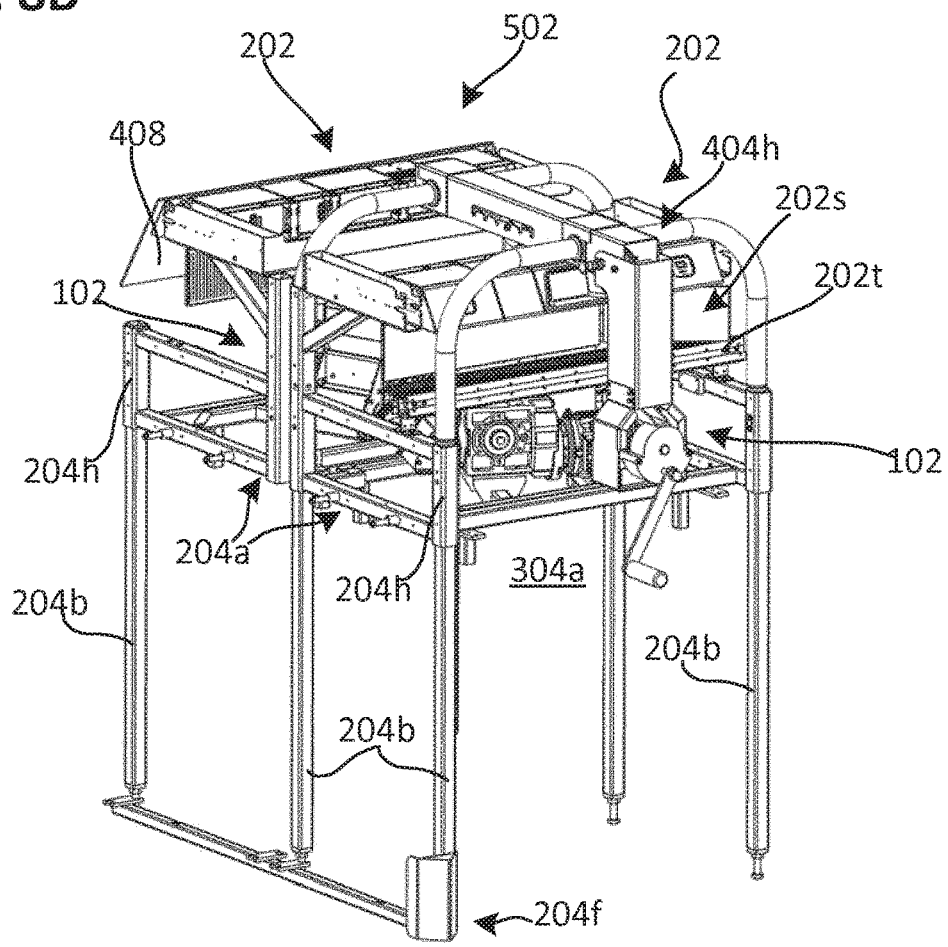

FIG. 8A to FIG. 8C illustrate two compactor arrangements 202 (for example a double module 202d or a compactor arrangement assembly 502) in various illustrations, for example during the setting up or installation of the two compactor arrangements 202.

Figure 9A:
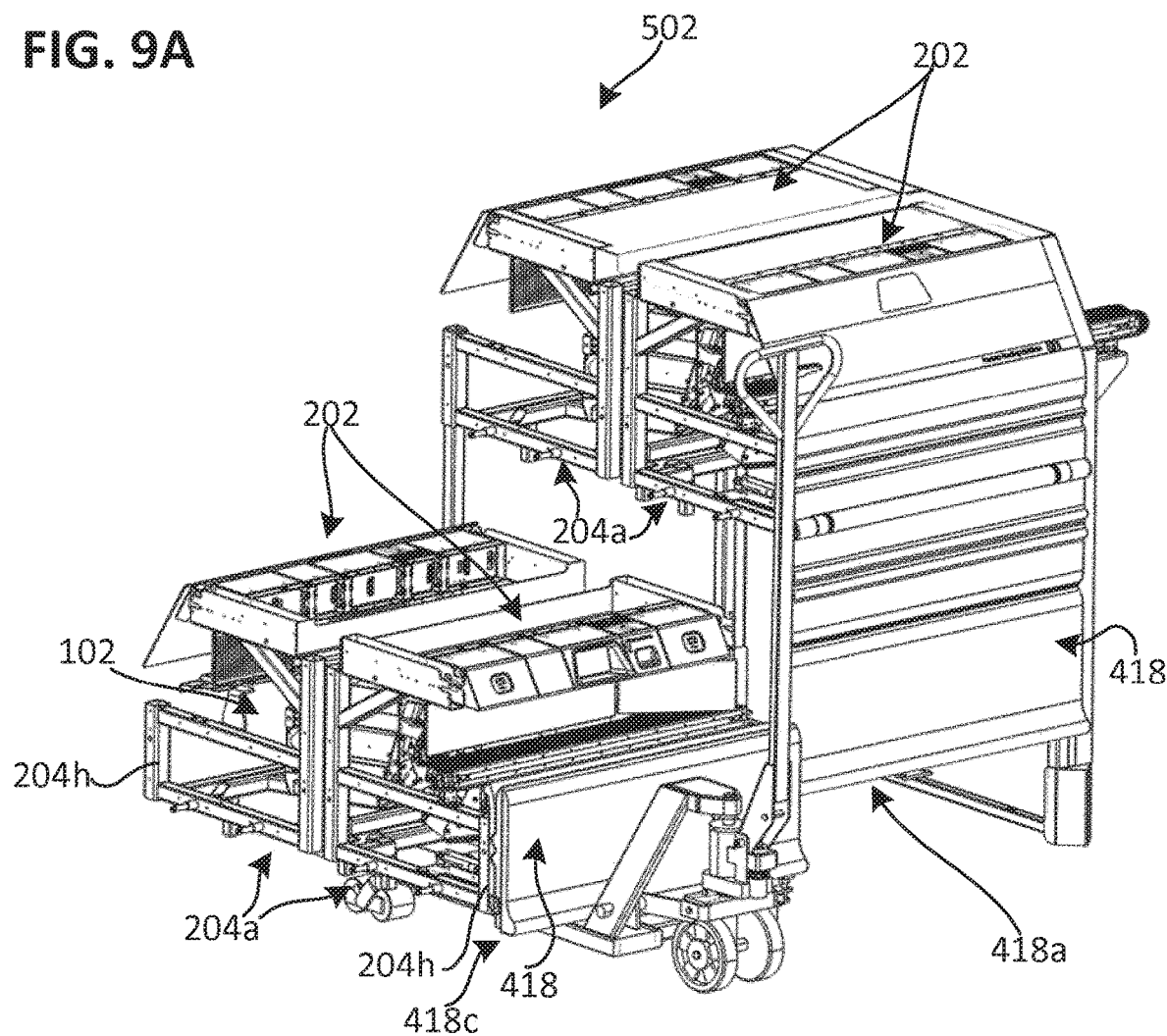

FIG. 9A to FIG. 9C illustrate four compactor arrangements 202 (for example two double modules 202d or a compactor arrangement assembly 502) in various illustrations, for example during the setting up or installation of the four compactor arrangements 202.

FIG. 7A, FIG. 8A and FIG. 9A each show, by way of example, one or more compactor arrangements 202 placed on the ground (see also FIG. 6, for example). In this case, the support framework 204a of the framework arrangement 204 may have multiple hollow profiles 204h. These hollow profiles 204h are for example designed to match the support legs 204b of the framework arrangement 204 such that in each case one support leg 204b can be inserted through in each case one hollow profile 204h for the purposes of setting up the support framework 204a on the ground.

The support legs 204b may for example be moved through the multiple hollow profiles 204h by means of a lifting device 404h in order to raise the support framework 204a to a predefined height, as illustrated for example in each case in FIG. 7B, FIG. 8B and FIG. 9B.

The lifting device 404h may for example be configured such that a force is transmitted between the support framework 204a and the support legs 204b for the purposes of raising the support framework 204a. For this purpose, the lifting device 404h may for example be supported (for example plugged or placed) onto the multiple support legs 204b. The support framework 204a may for example have a suspension structure for the coupling of the lifting device (for example by means of a traction mechanism, for example a cable, a chain, etc.), such that the support framework 204a can be raised by means of the lifting device 404h.

A connecting structure (e.g. bolts, screws, etc.) may be used to connect the support framework 204a to the multiple support legs 204b such that the support framework 204a is supported on the support legs 204b at the predefined height.

Furthermore, the support framework 204a may have a first support framework part and a second support framework part (for example a support frame 402t, as described above). Here, the compactor 102 of the compactor arrangement 202 may be arranged on the second support framework part. The first support framework part may be configured (see for example FIG. 4A, FIG. 4B and FIG. 5B) so as to form a receiving space for receiving the compactor 102 arranged on the second support framework part.

The compactor arrangement 202 may clearly be mounted (e.g. set up) for example in the following way: setting up a support framework 204a on an underlying surface, wherein the support framework 204a has multiple hollow profiles 204h; inserting multiple support legs 204b into the multiple hollow profiles 204h, wherein in each case one supporting leg 204b of the multiple supporting legs 204b is plugged into one hollow profile 204h of the multiple hollow profiles 204h; pushing the respective support legs 204b through the associated hollow profiles 204h in order to raise the support framework 204a to a predefined height; and connecting the support framework 204a to the multiple support legs 204b such that the support framework 204a is supported on the plurality of support legs 204b at the predefined height. Here, for the pushing of the support legs 204b through the hollow profiles 204h, a lifting force (generated for example by means of a traction device) may be generated between the support legs 204b and the support framework 204a.

The support framework 204a can clearly be set up in a self-lifting manner by means of the support legs 204b and the lifting device 404h.

FIG. 7C, FIG. 8C and FIG. 9C each show by way of example one or more set-up compactor arrangements 202 (see also for example FIGS. 5A to 5C and FIG. 6).

After the respective compactors 102 have been raised to a predefined height by means of the support framework 204a and the support legs 204b, further components of the compactor arrangement 202 may for example be installed. For example, the upper cover 408 of the respective compactor assembly 202 may be installed. Furthermore, a common empty-container transport device 202t may be installed. Furthermore, a housing 202g may be installed; for example, one or more housing parts may be installed. The housing may for example have lateral and/or upper housing parts.

As illustrated in FIGS. 8B and 9B, multiple compactor assemblies 202 may be installed using one common foot assembly 204f.

As illustrated in FIGS. 8B and 9B, it is for example possible for two coupled-together support frameworks 204a of two compactor arrangements 202 to be raised jointly. Six support legs 204b may be used for this purpose. The central two support legs 204b may then be uninstalled again, and the two compactor arrangements 202 may be set up by means of four support legs 204b.

As illustrated in FIG. 9A, the compactor arrangement 202 may be shipped, and for example transported by means of a lifting truck, with support legs 204b uninstalled.

The support framework 204a may for example be formed in two parts, that is to say have a first and a second support framework part. For example, the framework arrangement 204 may have the support framework 204a as first support framework part, as illustrated for example in FIG. 4A, and the framework arrangement 204 may also have the support frame 402t as second support framework part, as illustrated for example in FIG. 4B. The two support framework parts may for example be detachably coupled to one another, as shown for example in FIG. 6 and in FIGS. 7A to 9C.

The compactor 102 for compacting empty containers 104 may for example be arranged on the second support framework part, wherein the first support framework part 402t may be connected to the support legs 204b. Thus, for example, the compactor 102 can be exchanged without the rest of the compactor arrangement 202 being uninstalled. The compactor 102 can for example be lowered together with the second support framework part by means of a lifting device while the first support framework part remains set up by means of the support legs.

Installation of the compactor arrangement 202 may for example comprise the following: setting up a first support framework part, wherein the first support framework part has a receiving space for receiving a second support framework part; arranging the second support framework part below the receiving space, wherein a compactor is arranged on the second support framework part; introducing the compactor arranged on the second support framework part into the receiving space of the first support framework part; and subsequently fastening the second support framework part to the first support framework part by means of a detachable connection.

As described by way of example above (see for example FIG. 4D), the compactor arrangement 202, according to various embodiments, may have a function module arrangement (also referred to as front assembly 428f), which may be part of the electrical assembly 428 or may be linked to the electrical assembly. The function module arrangement may be installed on the support framework 204a, for example above the empty-container transport device 202t. The function module arrangement 1002 may have at least one function module which assumes the function of the previously described selection device.

Various embodiments of the function module arrangement 1002 will be described in detail below.

Figure 10A:
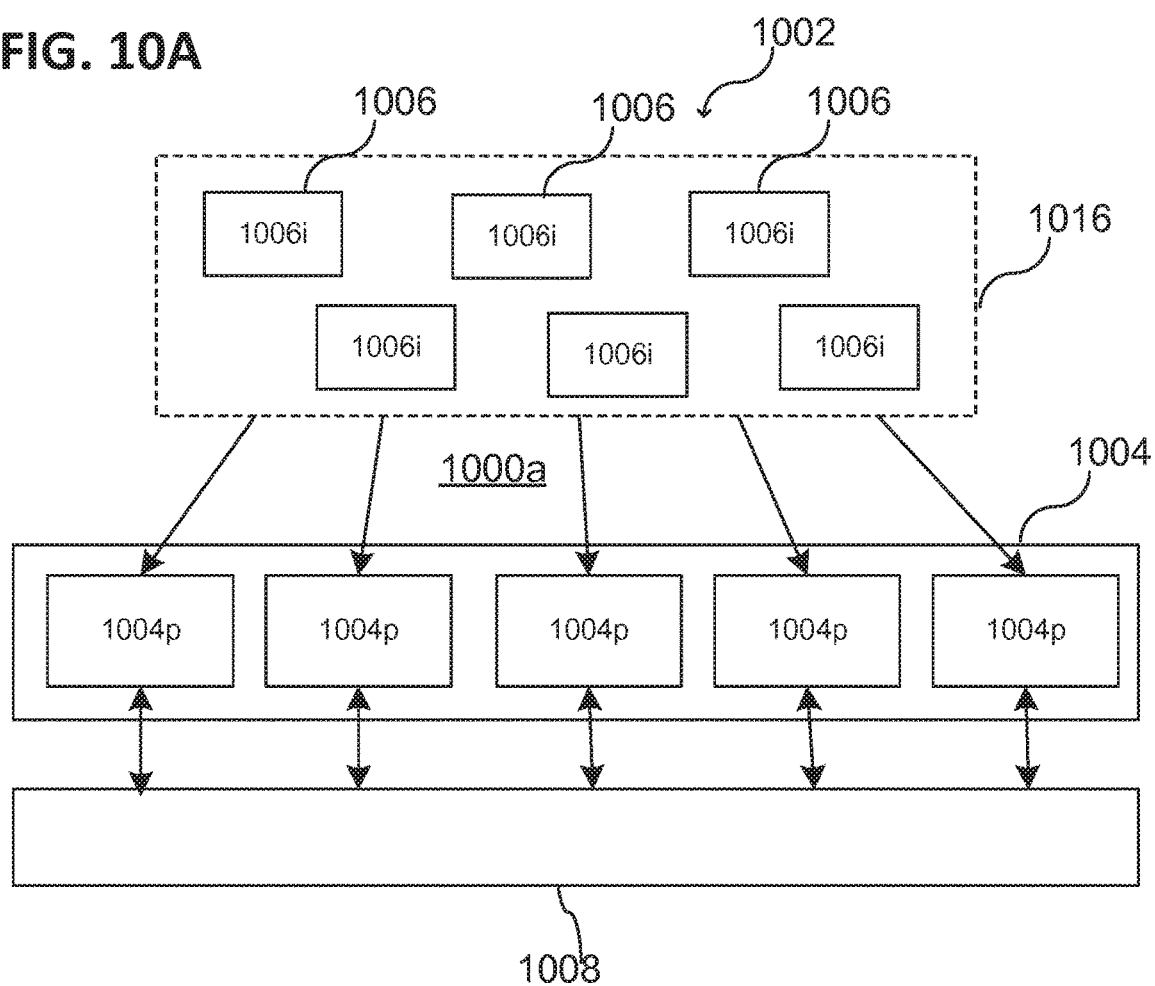
FIG. 10A and FIG. 10B show a function module arrangement in various schematic illustrations, according to various embodiments.
Figure 10B:
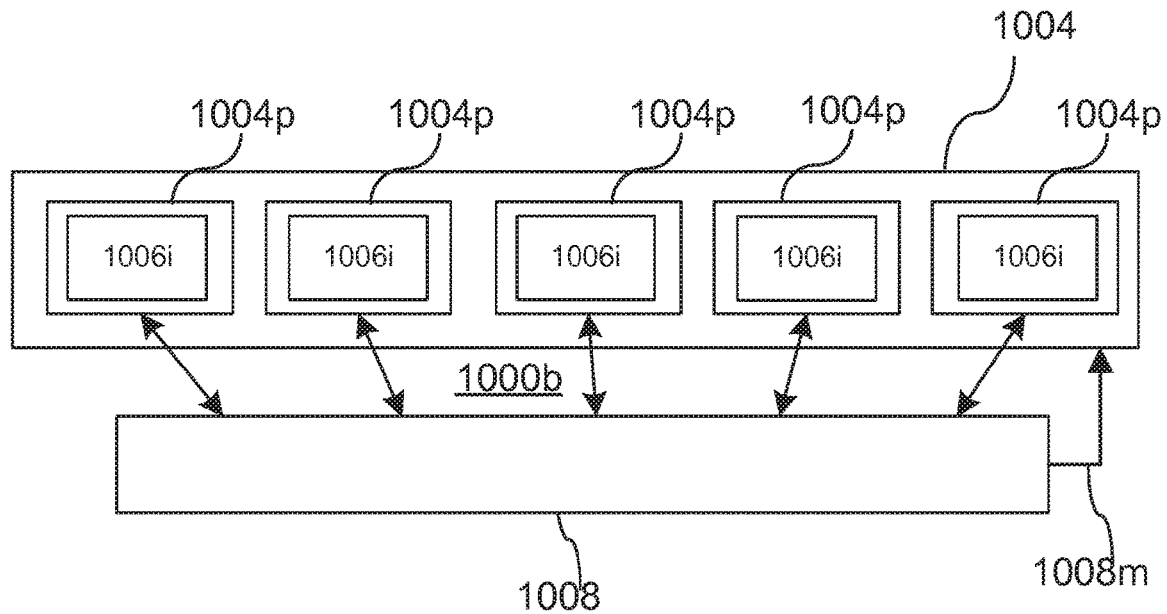

FIG. 10A and FIG. 10B illustrate a function module arrangement 1002, in each case in a schematic view, according to various embodiments. The function module arrangement 1002 may for example, at least in some aspects, be designed in a similar or identical manner to that described above with reference to the front assembly 428f of the compactor arrangement 202, and vice versa.

According to various embodiments, the function module arrangement 1002 may have a module receptacle 1004. The module receptacle 1004 may be configured such that multiple function modules 1006 can be received (1000a) in the module receptacle 1004.

Furthermore, the function module arrangement 1002 may have the multiple function modules 1006, which are configured such that they can be received (1000a) in the module receptacle 1004. A set 1016 of function modules 1006 can clearly be provided, wherein one or more of the function modules 1006 from the respective set 1016 of function modules 1006 can optionally be received 1000*a* in the module receptacle 1004.

Here, the module receptacle 1004 and the multiple function modules 1006 (for example the function modules 1006 from the set 1016 of function modules 1006) are provided such that the function modules 1006 can be received in the module receptacle 1004 in accordance with various configurations. For example, the number of function modules 1006 provided can clearly be greater than that which can be received in a configuration in the module receptacle 1004, such that this results in different configuration possibilities. Furthermore, the module receptacle 1004 may have different receptacle positions 1004*p* in which in each case one function module 1006 can be received. Thus, for example, different configurations can arise from the fact that a respective function module can be received in different receptacle positions 1004*p* in the module receptacle 1004.

According to various embodiments, the module receptacle 1004 may have a holding frame, a plug-in frame etc. for respectively holding the function modules 1006 in a predefined receptacle position 1004*p*. In addition thereto, the module receptacle 1004 may have corresponding electrical plug connection elements for the electrical contacting of the function modules 1006 received in the module receptacle 1004. The module receptacle 1004 may clearly have one or more electrical interfaces for supply to the function modules 1006 respectively received in the module receptacle 1004 and/or for communication (e.g. reading out, actuation etc.) with the respective function modules 1006 received in the module receptacle 1004.

According to various embodiments, at least one processor 1008 may be used which may be configured to ascertain 1000*b* an actual configuration of the multiple configurations and to selectively operate the function module arrangement 1002 in one operating mode 1008*m* out of multiple operating modes on the basis of the ascertained actual configuration. According to various embodiments, an operating mode may be assigned to each configuration that results for the function module arrangement 1002 on the basis of the various combinations of function modules 1006 received in the module receptacle 1004.

The at least one processor 1008 may clearly be used to ascertain which configuration of the function modules 1006 is respectively present in the module receptacle 1004 after the corresponding function modules 1006 have been received in the module receptacle 1004.

This respective configuration may be assigned an operating mode which may be selected on the basis of the ascertainment 1000*b* of the configuration.

The at least one processor 1008 may for example be arranged in an electrical box 428*e* of the compactor arrangement 202, be part of a set of control electronics, etc. The electrical box 428*e* may for example be arranged behind the function module arrangement 1002, as described above. Alternatively, the at least one processor 1008 may be integrated in at least one of the function modules 1006. Furthermore, the at least one processor 1008 may be integrated into an external control device that is communicatively linked to the function module arrangement 1002.

According to various embodiments, it is for example possible for at least one function module or multiple function modules or all function modules of the multiple function modules 1006 to be assigned an item of operating information 1006*i* in accordance with the function thereof. It is thus possible for the at least one processor 1008 to be configured to ascertain the item of operating information 1006*i* of the at least one function module (or of the multiple function modules or all function modules) of the multiple function modules 1006 when (e.g. as soon as) this is received in the module receptacle 1004. It is thus possible for the function module arrangement 1002 to be operated for example on the basis of the ascertained at least one item of operating information 1006*i*.

According to various embodiments, the at least one processor 1008 may be configured so as to check the actual configuration, and/or identify changes in the configuration, in a predefined time interval. If a change in the configuration is identified, the operating mode can be correspondingly changed if necessary.

According to various embodiments, the module receptacle 1004 and the multiple function modules 1006 may be designed to match one another, such that they form a modular system which can be configured in a simple manner. If necessary, the module receptacle 1004 may be configured such that it can be adapted in a simple manner to the function modules 1006 to be received, see for example FIG. 11A and FIG. 11B.

As illustrated by way of example in FIG. 10A, the module receptacle 1004 may be configured to receive 1000*a* multiple function modules 1006. The module receptacle 1004 may be configured to mechanically hold the function modules 1006 and fix them in a predefined position. According to various embodiments, the module receptacle 1004 and the function modules 1006 may be designed as a plug-in system, wherein the module receptacle 1004 has multiple plug-in positions 1004*p* into which the respective function modules 1006 can be plugged. Here, a plug-in function module 1006 may be fixed in the respective plug-in position by means of a quick-action fastener (e.g. by means of an automatically locking connection, which can for example be manually released).

The function module arrangement 1002 may clearly be configured such that it can be brought into different configurations on the basis of the combination of different function modules 1006. The respectively set configuration (which may correspond to an operating mode) can in this case be automatically identified, and the operation of the function module arrangement 1002 can be performed in accordance with the identified configuration. It is thus for example possible to avoid a situation in which, after a change of the configuration of the function module arrangement 1002 and/or after initial construction of the function module arrangement 1002, this has to be manually programmed or an operating mode has to be manually selected.

According to various embodiments, the function module arrangement 1002 may be configured such that the operating mode is automatically set on the basis of the function modules 1006 used (that is to say received in the module receptacle 1004). This permits, for example, a change of the configuration in a simple manner, for example without the need for trained technical personnel. The function modules 1006 may be configured such that faulty operation of the function module arrangement 1002 is ruled out.

According to various embodiments, the configuration of the function module arrangement 1002 may be changed for example by virtue of a function module 1006 of a first function module type which is received in the module receptacle 1004 being exchanged for a function module 1006 of a second function module type (which differs from the first function module type). The configuration of the function module arrangement 1002 is thus clearly changed by virtue of at least one function of the function module arrangement 1002 being changed. According to various embodiments, the configuration of the function module arrangement 1002 may be changed for example by virtue of the relative arrangement of the function modules 1006 with respect to one another (for example the sequence thereof) being changed. It is clearly possible, for example, for an operating direction of the function module arrangement 1002 to be switched over, for example from right-handed operation to left-handed operation (see for example FIG. 11C and FIG. 11D). This may for example be helpful if the compactor arrangement 202 is to be integrated into a compactor means 300 with multiple compactor arrangements 202, as described above. For example, two compactor arrangements 202 arranged back-to-back may have opposite operating directions, that is to say one of the two compactor arrangements 202 is in left-handed operation and the other of the two compactor arrangements 202 is in right-handed operation.

At least one processor 1008 may be used for the automatic adaptation and/or for the automatic selection of an operating mode of the function module arrangement 1002 on the basis of the respective configuration, which may be defined by the function modules 1006 respectively received in the module receptacle 1004. Any suitable electronic circuit (based on analog or digital data processing) may be used as processor 1008, for example a conventional computer processor, an application-specific integrated circuit (ASIC), etc. A suitable computer system may clearly be used as a central or peripheral open-loop and/or closed-loop control means. In general, the functions respectively described herein may be implemented by means of a single processor or using multiple processors. Here, the at least one processor 1008 may also be assigned at least one memory, or the at least one processor 1008 may have a memory.

According to various embodiments, the item of operating information 1006*i* may be suitably encoded or stored in the respective function module 1006. The item of operating information 1006*i* may for example represent a function module type of the respective function module 1006, such that this can be identified. Furthermore, the item of operating information 1006*i* may represent an item of control information which is taken into consideration in the control of the compactor arrangement 202, for example in the actuation of the respective function modules 1006, in the actuation of a compactor 102 of the compactor arrangement 202 etc.

Figure 11A:
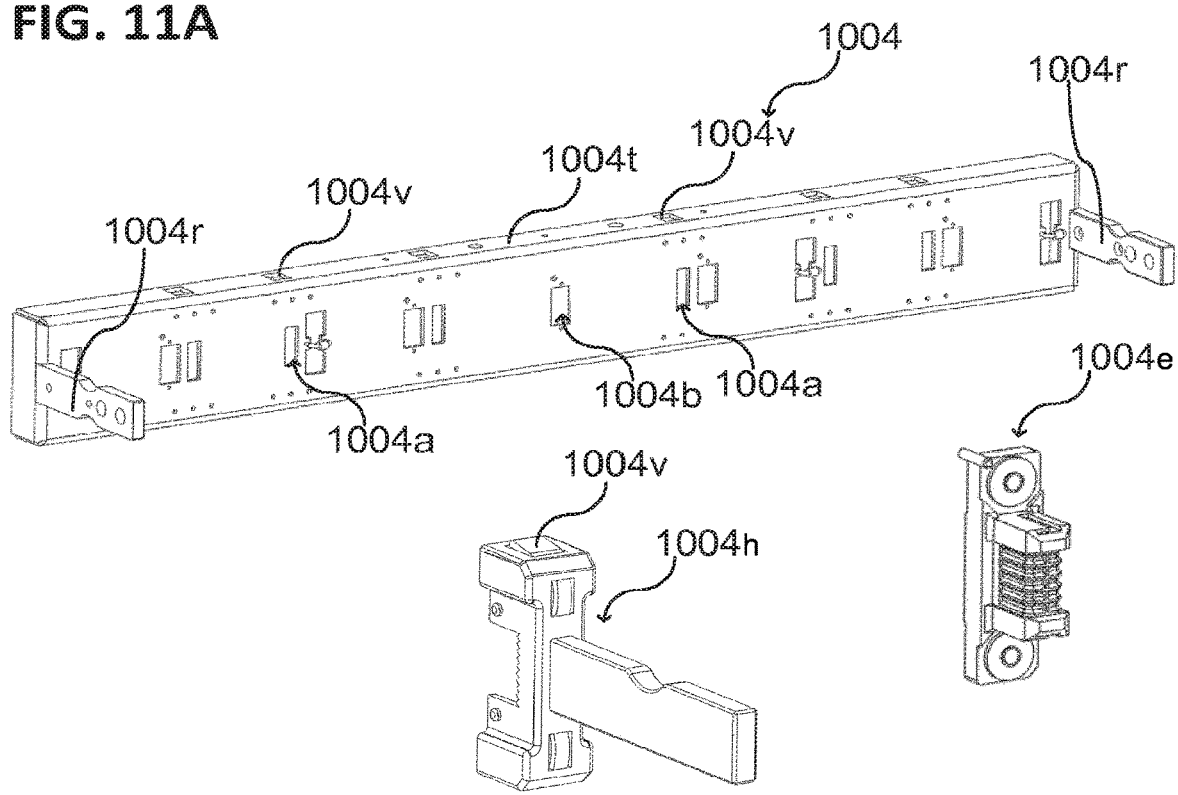
FIG. 11A and FIG. 11B show a module receptacle of a compactor arrangement in various schematic illustrations, according to various embodiments.
Figure 11B:
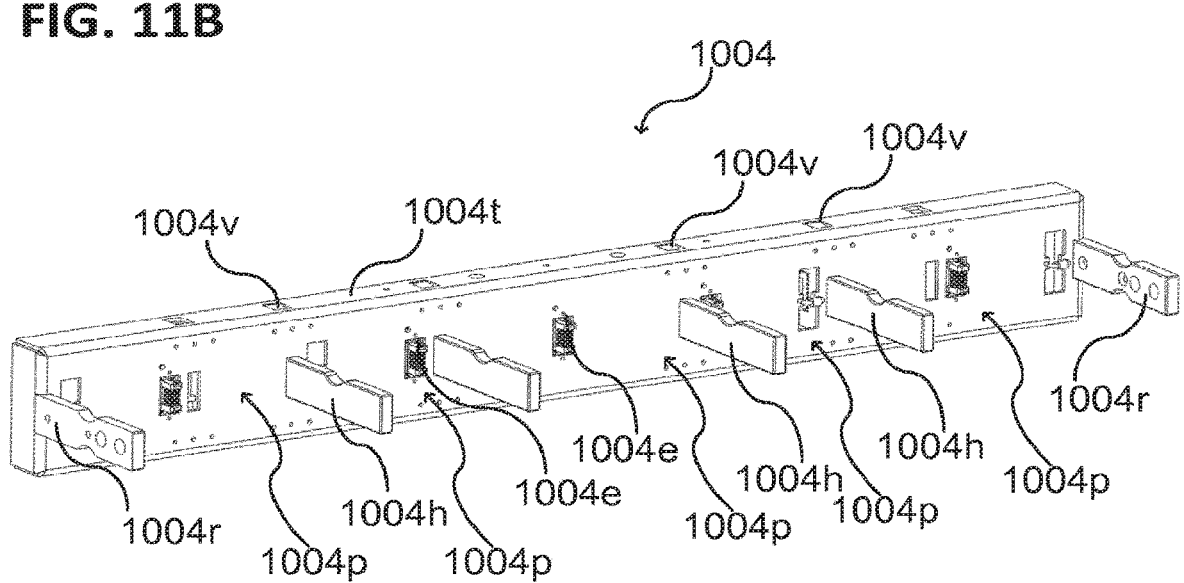

FIG. 11A and FIG. 11B illustrate, by way of example, a module receptacle 1004 in a schematic view, according to various embodiments. FIG. 11C to FIG. 11F each illustrate, by way of example, a function module arrangement 1002 with the module receptacle 1004 and function modules 1006 correspondingly received therein in various exemplary configurations 1100*c* to 1100*f*.

The module receptacle 1004 may for example be provided in the form of a preconfigured or configurable carrier 1004*t*. For example, two outer holding elements 1004*r* may be fixedly or detachably installed on this carrier 1004*t*. Furthermore, the carrier 1004*t* may for example have predefined cutouts 1004*a* (for example through holes). By means of the cutouts 1004*a* in the carrier 1004*t*, one or more holding elements 1004*h* can be installed in different positions on the carrier 1004*t*. The respective holding element 1004*h* may be connected to the carrier 1004*t* by means of an automatically locking connection 1004*v* or in some other suitable manner, for example by means of a screw connection, etc.

Furthermore, the carrier 1004*t* may for example have predefined further cutouts 1004*b* (for example further through holes). By means of the further cutouts 1004*b* in the carrier 1004*t*, one or more elements 1004*e* of an electrical plug connection can be installed in different positions on the carrier 1004*t*. The respective element 1004*e* of the electrical plug connection may for example be connected to the carrier 1004*t* by means of an automatically locking connection or in some other suitable manner, for example by means of a screw connection, etc.

As illustrated for example in FIG. 11B, the module receptacle 1004 may correspondingly have, between the holding elements 1004*r*, 1004*h*, multiple receptacle positions 1004*p* for receiving (e.g. plug-in positions for plugging in) multiple function modules 1006, wherein in each case only one function module 1006 can be received in one of the receptacle positions 1004*p*. The module receptacle 1004 and the function modules 1006 are designed to match one another. The receptacle positions 1004*p* of the module receptacle 1004 may for example be adapted to the function modules 1006 to be received, for example by adaptation of the holding elements 1004*h* and/or of the elements 1004*e* of the electrical plug connection.

According to various embodiments, the function modules 1006 may each have a further element of the electrical plug connection, such that the function modules 1006 can be correspondingly electrically contacted by means of the electrical plug connection in the receptacle positions 1004*p*.

According to various embodiments, the elements 1004*e* of the electrical plug connection may be configured such that function modules 1006 of different types (e.g. all function modules 1006 of the set 1016 of function modules 1006) can be plugged onto them.

According to various embodiments, the module receptacle 1004 may have corresponding electrical interfaces for the electrical contacting of the function modules 1006 received in the module receptacle 1004, for example based on the elements 1004*e* of the electrical plug connection. By means of the electrical interfaces, communication between the at least one processor 1008 and the respective function modules 1006 and/or communication between the function modules 1006 themselves can be provided (the electrical interfaces can clearly be configured as data and/or communication interfaces). Alternatively, the communication between the respective function modules 1006 themselves and/or between the at least one processor 1008 and the respective function modules 1006 may be provided by means of a wireless interface (e.g. by means of a radio interface).

Furthermore, the electrical interfaces may be used to provide a power supply for the function modules 1006 respectively received in the module receptacle 1004.

Figure 11C:
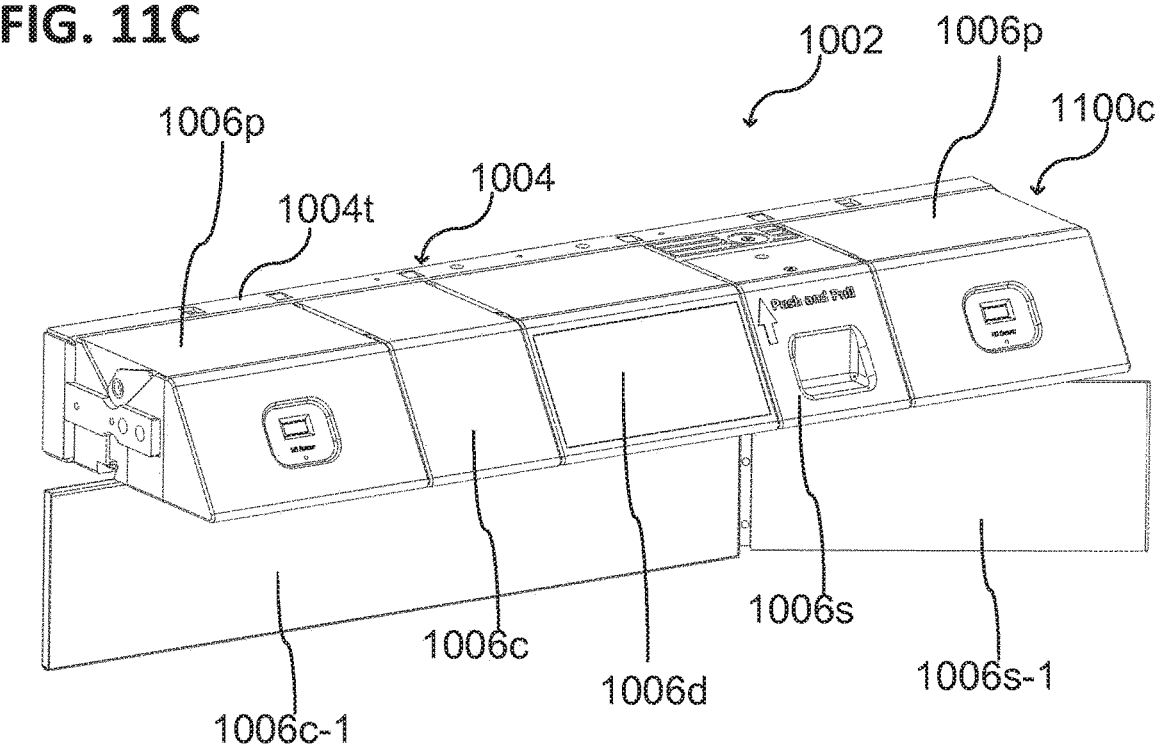
FIG. 11C to FIG. 11F show a compactor arrangement in various schematic illustrations, according to various embodiments.
Figure 11D:
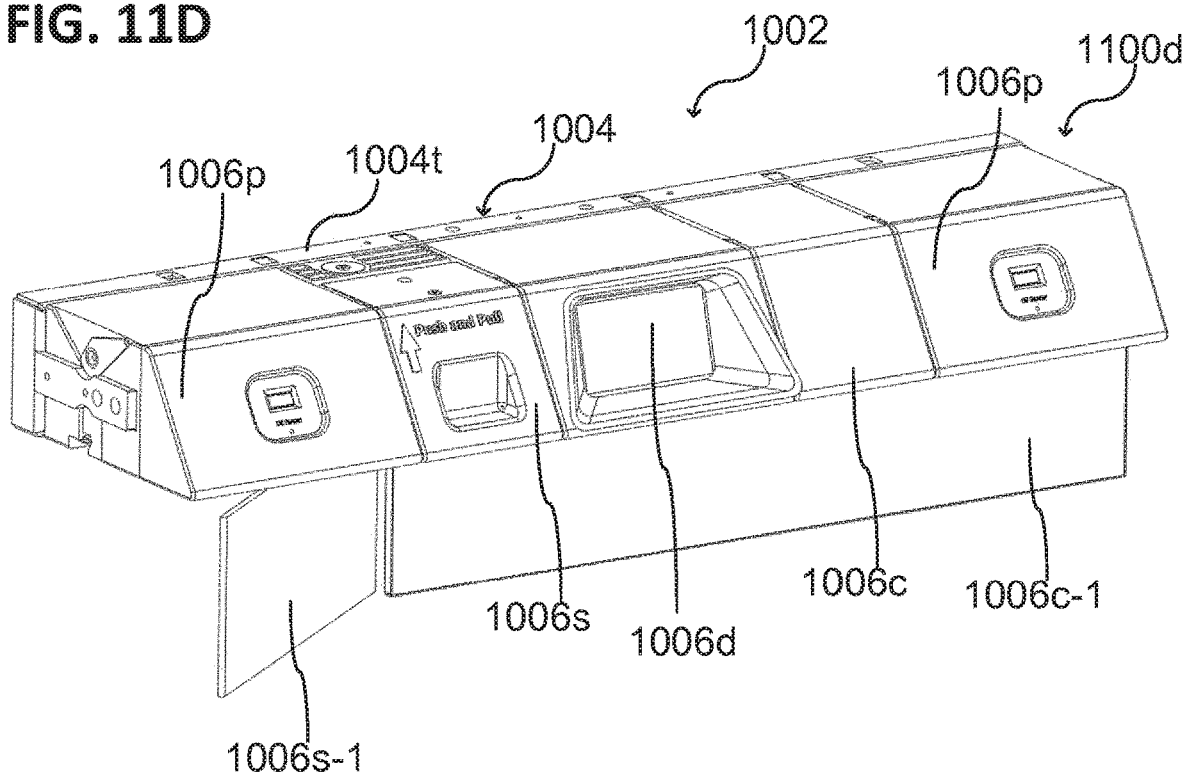

FIG. 11C and FIG. 11D each illustrate a function module arrangement 1002 in a schematic view, according to various embodiments. The function module arrangement 1002 may for example have multiple mutually different types of function modules 1006 which are received simultaneously in the module receptacle 1004, for example in accordance with a first configuration 1100*c* and in a second configuration 1100*d*.

The function module arrangement 1002 has for example a selection module 1006*s* (also referred to as sorting module or modular sorting assembly), for example as a function module 1006 of a first function module type. According to various embodiments, the selection module 1006*s* may be configured such that empty containers 104 being led in the compactor arrangement 202 by means of the empty-container transport device 202*t* may be selected, for example for the selective feed of the empty containers 104 into the compactor 102. Here, the empty containers 104 may for example be classified and correspondingly selected as has been described above with reference to the selection device 202s.

The selection module 1006s may for example be plugged into the module receptacle 1004. Here, inadvertent pulling-out of the selection module 1006s can be prevented by means of a locking means with blocking action. The selection module 1006s may for example be arranged above the empty-container transport device 202t when this has been plugged into the module receptacle 1004.

Here, empty containers 104 can be selectively led from the empty-container transport device 202t into the compactor 102 of the compactor arrangement 202 by means of a pivotably mounted flap 1006s-1 (also referred to as sorting paddle) of the selection module 1006s. The pivotably mounted flap 1006s-1 may be operated by means of an electric motor, for example between a first position (see FIG. 11C and FIG. 11D) and a second position (see FIG. 11E).

The selection module 1006s may be contacted by means of an electrical plug connection when said selection module has been received in the module receptacle 1004, see FIG. 11B. Here, the electrical plug connection can for example ensure multiple functions. Firstly, the supply of power to and the actuation of the pivotably mounted flap 1006s-1 of the selection module 1006s itself may be performed via the electrical plug connection. Secondly, it is for example possible for an item of operating information 1006i of the selection module 1006s to be transmitted (for example to the at least one processor 1008 or to another of the function modules 1006 received in the module receptacle 1004), as described above. Here, the item of operating information 1006i may for example represent the presence of the selection module 1006s and/or the type thereof.

On the basis of the item of operating information 1006i of the selection module 1006s, it is for example possible for the cutting unit of the compactor 102 of the compactor arrangement 202 to be deactivated, for example if the selection module 1006s is not received in the module receptacle 1004 (clearly if the selection module 1006s is not present). On the basis of the item of operating information 1006i of the selection module 1006s, it is for example possible for an operating state of the function module arrangement 1002 to be selected and set. Here, on the basis of the item of operating information 1006i, it is furthermore possible for the operation of the function module arrangement 1002 to be adapted with regard to whether it is right-handed operation (e.g. with the selection module type in right-handed configuration as illustrated in FIG. 11D) or left-handed operation (e.g. with the selection module type in left-handed configuration as illustrated in FIG. 11C).

According to various embodiments, the module receptacle 1004 and the function modules 1006 may have a symmetrical construction with respect to the arrangement of the selection module 1006s, such that it is for example possible in a simple manner to switch over between the two configurations 1100c, 1100d illustrated in FIG. 11C and FIG. 11D (clearly between the right-handed and the left-handed configuration). It is clearly possible for a selection module 1006s to be arranged in a different receptacle position 1004p of the module receptacle 1004 in the left-handed configuration than in the right-handed configuration, wherein it is for example also possible for the selection module 1006s itself to be correspondingly designed as a left-handed selection module 1006s (e.g. a selection module of a first selection module type) or right-handed selection module 1006s (e.g. a selection module of a second selection module type).

It is clearly possible for the right-handed and the left-handed configuration to differ in terms of the discharge direction for the empty containers 104. Here, the function module arrangement 1002 can be operated either in the right-handed configuration or in the left-hand configuration, which may be ascertained on the basis of the respective selection module type of the selection module 1006s received in the module receptacle 1004.

Furthermore, the function module arrangement 1002 may have a selection information module 1006c (also referred to as encoder module or modular encoder assembly).

On the basis of the right-handed/left-handed configuration with respect to the selection module 1006s, it is possible, according to various embodiments, for the receptacle position 1004p for the selection information module 1006c to be predefined if it is the intention to realize a symmetrical construction. It is clearly possible for the same receptacle position 1004p of the module receptacle 1004 to be used both for the selection module 1006s and for the selection information module 1006c.

According to various embodiments, the selection information module 1006c may provide an item of selection information as an item of operating information 1006i, which may specify the actuation and/or the operation of the selection module 1006s. For example, the item of selection information provided by the selection information module 1006c may define what class (type, material, color, etc.) of empty containers 104 is to be selected by means of the selection module 1006s. According to various embodiments, the set 1016 of function modules 1006 may, for each class of empty containers 104 to be distinguished, have a selection information module 1006c assigned to the class. It is thus possible, for example by virtue of the respective selection information module 1006c being introduced into the module receptacle 1004, to set which class of empty containers 104 is to be compacted by means of the compactor 102 of the compactor arrangement 202.

By means of the electrical plug connection as described above, it is possible for an electrical power supply for the selection information module 1006c to be provided if required. Furthermore, it is for example possible for an item of operating information 1006i of the selection information module 1006c to be transmitted (for example to the at least one processor 1008 or to another of the function modules 1006 received in the module receptacle 1004). Here, the item of operating information 1006i may for example represent the presence of the selection information module 1006c and/or the item of selection information thereof.

According to various embodiments, the selection information module 1006c may optionally have a visual display 1006c-1. It is thus possible, for example, to display what class of empty containers 104 is respectively selected, for example clear plastic, coloured plastic, cans, glass, etc. The visual display 1006c-1 may for example be provided by means of a plate which has illumination channels for displaying the operating state. According to various embodiments, a fill level of a collecting vessel 152 which is assigned to the function module arrangement 1002 may be displayed by means of the visual display 1006c-1. The fill level may for example be ascertained by means of a fill level sensor and the display may be output on the basis thereof.

According to various embodiments, the function module arrangement 1002 may have one peripheral module 1006p or two (e.g. symmetrically arranged) peripheral modules 1006p. Here, the one peripheral module 1006p or at least one of the two peripheral modules 1006p may have at least one sensor (also referred to herein as sensor module 1006p).

According to various embodiments, two peripheral modules 1006*p*, as illustrated for example in FIGS. 11C and 11D, may be positioned at the outer edge of the module receptacle 1004. The two peripheral modules 1006*p* may be arranged in mirror-symmetrical fashion and of identical construction.

The respective peripheral module 1006*p* may for example have sensor means (e.g. one or more sensors). The sensor means may be configured to detect a passage of an empty container 104, for example on the basis of ultrasound and/or transmitted light.

According to various embodiments, the sensor means may, in the peripheral module 1006*p*, be surrounded by a module housing, that is to say said sensor means is clearly not exposed and is thus protected against access.

According to various embodiments, it is furthermore possible for a sensor means for an automatic opening and/or closing of the upper cover 408 (for example on the basis of gesture control etc.), as described above, to be provided in at least one of the peripheral modules 1006*p*.

By means of the electrical plug connection as described above, it is possible for an electrical power supply for the respective peripheral module 1006*p* to be provided if required. Furthermore, it is for example possible for an item of operating information 1006*i* of the respective peripheral module 1006*p* to be transmitted (for example to the at least one processor 1008 or to another of the function modules 1006 received in the module receptacle 1004). Here, the item of operating information 1006*i* may for example represent the presence of the respective peripheral module 1006*p* and/or the sensor data etc. thereof.

According to various embodiments, the respective peripheral module 1006*p* may functionally supplement the respectively adjacent assembly, for example may functionally supplement the function of the selection module 1006*s*. For example, the operation of the respective selection module 1006*s* may be supplemented on the basis of the sensor data ascertained by the sensor means of the adjacent peripheral module 1006*p*. It is thus for example possible for empty containers 104 to be selectively compacted in accordance with the class defined by the selection information module 1006*c* and on the basis of the sensor data.

According to various embodiments, the respective peripheral module 1006*p* may have structural space for further functional elements (e.g. a sensor, an open-loop controller, a closed-loop controller, a safety circuit etc.) and, as required, the respective further functional elements.

According to various embodiments, the respective peripheral module 1006*p* may be configured so as to assume the functions of the selection information module 1006*c*. This may for example be helpful when a discharge module 1006*a* with a discharge flap 1006*a*-1 is to be arranged at the end of the transport path (clearly at an outer receptacle position of the module receptacle 1004), as illustrated for example in FIG. 11F in a further configuration 1100*f*. In this case, it is for example possible to use two peripheral modules 1006*p*, wherein one peripheral module 1006*p* is configured so as to assume the function of the selection information module 1006*c*, as described above. Here, the peripheral module 1006*p* which assumes the function of the selection information module 1006*c* may be arranged in the receptacle position 1004*p* provided for the selection information module 1006*c*.

According to various embodiments, the respective peripheral module 1006*p* may have an illumination means which may be designed such that an operating mode of the function module arrangement 1002 or of the compactor arrangement 202 can be displayed, for example in color-coded fashion.

According to various embodiments, the function module arrangement 1002 may have a display module 1006*d*. The display module 1006*d* may for example be arranged centrally in the module receptacle 1004, for example irrespective of the various configurations 1100*c* to 1100*f* of the function module arrangement 1002.

According to various embodiments, the display module 1006*d* may have a display (e.g. a TFT display etc.) or at least one or more illuminated panels for displaying a system status of an individual function module 1006 of the function module arrangement 1002 and/or a system status of the function module arrangement 1002 as a whole.

Instead of the display module 1006*d*, it is alternatively possible for a peripheral module 1006*p* to be received in the module receptacle 1004. Here, according to various embodiments, the same electrical interface may be used irrespective of the type of function module 1006 received.

Figure 11E:
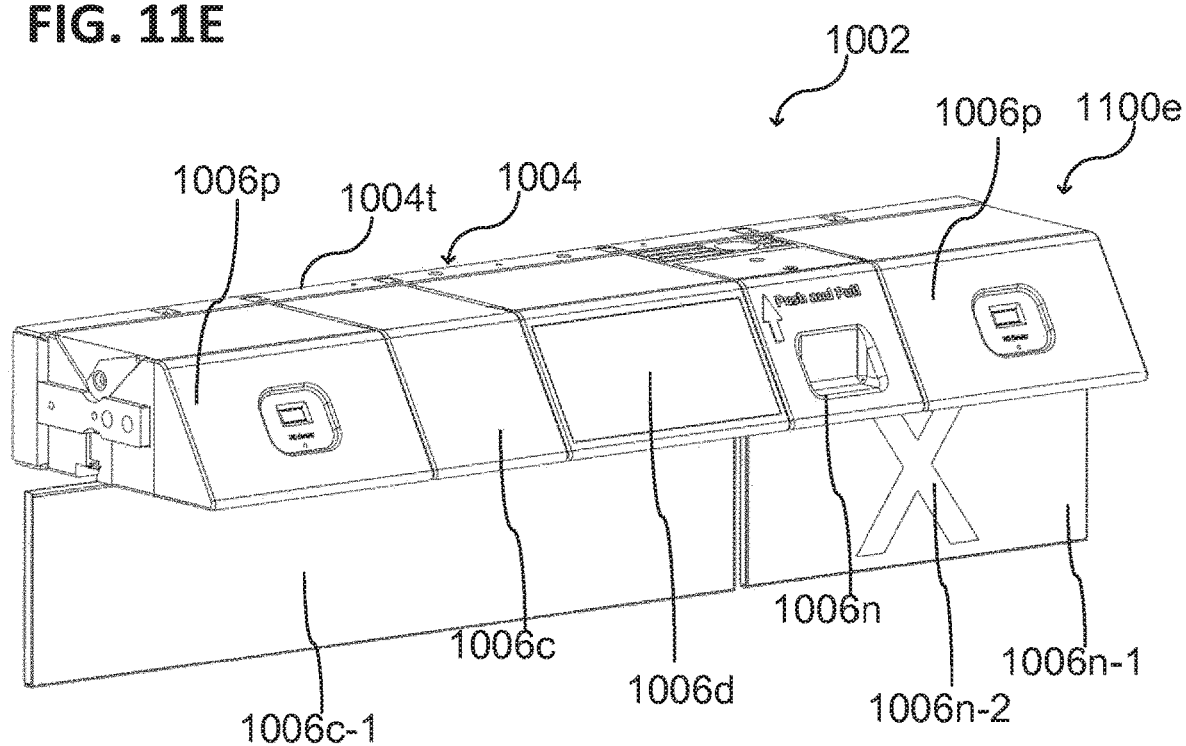
Figure 11F:
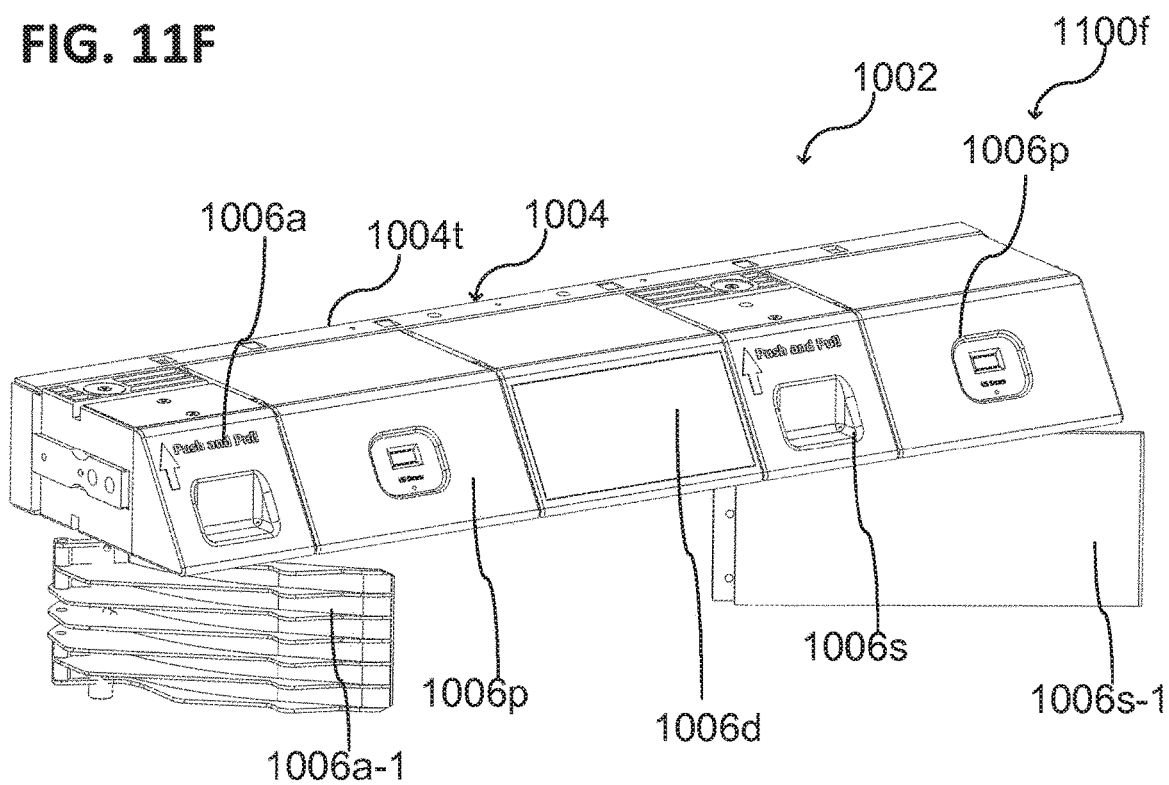

FIG. 11E illustrates a function module arrangement 1002 in a further configuration 1100*e*, for example as an alternative to the configuration 1100*c* illustrated in FIG. 11C or analogously as an alternative to the configuration 1100*d* illustrated in FIG. 11D.

According to various embodiments, the function module arrangement 1002 may have a guard module 1006*n*. The guard module 1006*n* may, according to various embodiments, be received instead of a selection module 1006*s* in the module receptacle 1004. The guard module 1006*n* may clearly be a dummy module as a placeholder for a removed selection module 1006*s*.

According to various embodiments, the guard module 1006*n* may be configured so as to block an access to a compactor 102 of the compactor arrangement 202 (e.g. to the cutting unit thereof). It is thus possible, for example, for inadvertent encroachment into the cutting unit of a compactor 102 of the compactor arrangement 202 to be prevented when, for example, the selection module 1006*s* is not received in the module receptacle 1004. Furthermore, the guard module 1006*n* may be configured so as to (e.g. laterally) delimit a transport region above the empty-container transport device 202*t*. For this purpose, the guard module 1006*n* may for example have a guard plate 1006*n*-1 which occupies substantially the same position as the pivotably mounted flap 1006*s*-1 of the selection module 1006*s* when this has not been pivoted over the empty-container transport device 202*t*. The guard plate 1006*n*-1 may for example be rigidly installed.

According to various embodiments, the guard module 1006*n* may provide an item of operating information 1006*i* which specifies the actuation and/or the operation of a compactor 102 of the compactor arrangement 202. For example, the item of operating information 1006*i* provided by the guard module 1006*n* may define that operation of the compactor 102 (e.g. the rotation of the cutting unit of the compactor 102) should be blocked when (e.g. as soon as and for as long as) the guard module 1006*n* is received in the module receptacle 1004.

By means of the electrical plug connection, as described above, it is for example possible for the item of operating information 1006*i* of the guard module 1006*n* to be transmitted (for example to the at least one processor 1008 or to another of the function modules 1006 received in the module receptacle 1004). Here, the item of operating information 1006*i* may for example be or represent the presence of the guard module 1006*n*.

Thus, for example in the event that the compactor 102 of the compactor arrangement 202 has pulled in a foreign body which has caused a defect at the cutting unit, the cutting unit can be deactivated by means of the insertion of the guard module 1006*d* into the module receptacle 1004, such that the compactor arrangement 202 itself can continue to be safely operated in a pass-through operating mode.

According to various embodiments, the function module arrangement 1002 may be configured such that the presence of the guard module 1006*n* is signaled, for example by means of the display module 1006*d*, etc. Furthermore, a message can be issued to servicing personnel if the guard module 1006*n* is introduced into the module receptacle 1004.

The operating state of the function module arrangement 1002 in the presence of the guard module 1006*n* may for example be displayed by the guard module 1006*n* itself. For this purpose, the guard module 1006*n* may have an illumination element 1006*n*-2 on the guard plate 1006*n*-1.

According to various embodiments, a function module 1006 received in the module receptacle 1004, multiple or all function modules 1006 received in the module receptacle 1004 may be connected by means of an interface (e.g. an electrical plug connection, as described above) to a set of control electronics (e.g. having the at least one processor 1008 or implemented in the at least one processor 1008), which may for example be arranged in an electrical box.

Figure 12:
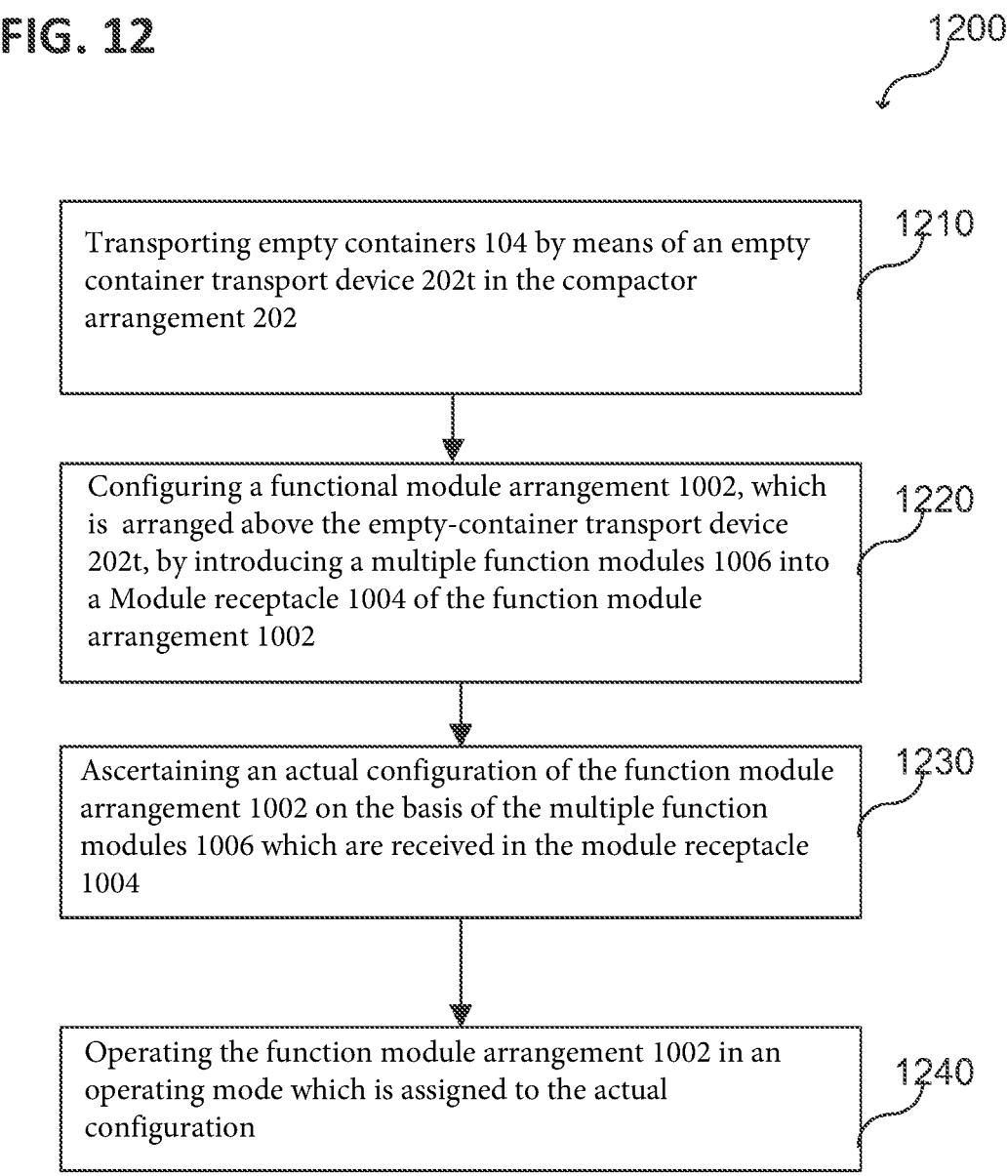
FIG. 12 shows a schematic flow diagram of a method for operating a compactor arrangement, according to various embodiments.

FIG. 12 illustrates a schematic flow diagram of a method 1200 for operating a compactor arrangement 202, according to various embodiments. The method 1200 may for example comprise: in 1210, transporting empty containers 104 by means of an empty-container transport device 202*t* in the compactor arrangement 202; in 1220, configuring a function module arrangement 1002, which is arranged above the empty-container transport device 202*t*, by introducing multiple function modules 1006 into a module receptacle 1004 of the function module arrangement 1002; in 1230, ascertaining an actual configuration of the function module arrangement 1002 on the basis of the multiple function modules 1006 which are received in the module receptacle 1004; and, in 1240, operating the function module arrangement 1002 in an operating mode which is assigned to the actual configuration.

Furthermore, the method 1200 may comprise: changing the actual configuration of the function module arrangement 1002 by exchanging at least one of the multiple function modules 1006 for at least one further function module of a different type; and ascertaining the changed actual configuration of the function module arrangement 1002 on the basis of the multiple function modules 1006 which are received in the module receptacle 1004.

Furthermore, the method may be configured as described herein with regard to the compactor arrangement 202 and the functioning thereof.

According to various embodiments, one function module 1006 of the function module arrangement 1002 or multiple or all function modules 1006 of the function module arrangement 1002 can be identified on the basis of an item of operating information 1006*i*. It is clearly possible, for example, for the respective type of the function module 1006 used (clearly the function thereof) to be ascertained on the basis of the item of operating information 1006*i*. On the basis of this, a corresponding operating mode for the function module arrangement 1002 can be selected, and/or the function module arrangement 1002 can be operated in the corresponding operating mode.

The item of operating information 1006*i* may be provided in any form on the basis of which the function modules 1006 can be identified. According to various embodiments, the item of operating information 1006*i* may be provided such that the respective function or the respective type of the function modules 1006 can be uniquely identified.

According to various embodiments, the item of operating information 1006*i* may be a pointer which refers to an associated table in which the items of operating information 1006*i* are stored.

According to various embodiments, the item of operating information 1006*i* may be implemented by means of a correspondingly configured electronic circuit (e.g. a control circuit) in the respective function module 1006. Here, the function module arrangement 1002 may be configured so as to be operated on the basis of the control circuit of one of the function modules 1006 received in the module receptacle 1004.

According to various embodiments, the respective functions that are described herein (e.g. with regard to the at least one processor 1008) may be implemented in hardware form, for example in any suitable electronic circuit, and/or in software form, for example on a data carrier (e.g. as a control program) and executed by at least one processor.

Below, various examples will be described which relate to that which has been described and illustrated above.

Example 1 is a compactor arrangement 202 having: a support framework 204*a* for supporting a compactor 102, an empty-container transport device 202*t* for transporting empty containers 104 in the compactor arrangement 202, a function module arrangement 1002 which is arranged on the support framework 204*a* above the empty-container transport device 202*t*, wherein the function module arrangement 1002 has: a module receptacle 1004 for receiving multiple function modules 1006, the multiple function modules 1006, which can be selectively received in the module receptacle 1004, wherein each function module of the multiple function modules 1006 is assigned an item of operating information 1006*i* in accordance with the function thereof; at least one processor 1008 which is configured to ascertain at least one item of operating information 1006*i* of at least one function module of the multiple function modules 1006 when the at least one function module is received in the module receptacle 1004 and to operate the function module arrangement 1002 on the basis of the ascertained at least one item of operating information 1006*i*.

In example 2, the compactor arrangement 202 as per example 1 may furthermore comprise that at least one function module of the multiple function modules has an identification feature which is assigned to the item of operating information 1006*i*, and that the at least one processor 1008 is configured to ascertain the item of operating information 1006*i* on the basis of the identification feature when the at least one function module is received in the module receptacle 1004.

In example 3, the compactor arrangement 202 as per example 2 may furthermore comprise that at least one function module of the multiple function modules 1006 has a data memory in which data are stored, and that the at least one processor 1008 is configured to read out the data when the at least one function module is received in the module receptacle 1004 and to ascertain the item of operating information 1006*i* on the basis of the read-out data.

In example 4, the compactor arrangement 202 as per any of examples 1 to 3 may furthermore comprise that the multiple function modules 1006 have a selection module 1006*s*, and that the at least one processor 1008 is configured to actuate the selection module 1006*s*, when the latter is received in the module receptacle 1004, such that empty containers 104 being transported by means of the empty-container transport device 202*t* can be selectively fed to the compactor 102 of the compactor arrangement 202 by means of the selection module 1006s.

In example 5, the compactor arrangement 202 as per example 4 may furthermore comprise that the selection module 1006s has a pivotably mounted flap 1006s-1 and an actuating drive for pivoting the flap 1006s-1 into a first position and into a second position, and that the selection module 1006s is configured such that, when the flap 1006s-1 is in the first position, empty containers 104 being transported by means of the empty-container transport device 202t can be fed by means of the flap 1006s-1 to the compactor 102 of the compactor arrangement 202, and that, when the flap 1006s-1 is in the second position, empty containers 104 can be transported by means of the empty-container transport device 202t through the compactor arrangement 202.

In example 6, the compactor arrangement 202 as per example 4 or 5 may furthermore comprise that the selection module 1006s is designed as a selection module of a first selection module type or of a second selection module type, and that the at least one processor 1008 is further configured to actuate the empty-container transport device 202t such that the empty-container transport device 202t is moved in a first transport direction when a selection module of the first selection module type is received in the module receptacle 1004, and that the empty-container transport device 202t is moved in a second transport direction, which differs from the first transport direction, when a selection module of the second selection module type is received in the module receptacle.

In example 7, the compactor arrangement 202 as per any of examples 4 to 6 may furthermore comprise that the multiple function modules 1006 have a guard module 1006n, and that the at least one processor 1008 is configured to deactivate the compactor 102 of the compactor arrangement 202 when the guard module 1006n is received in the module receptacle 1004.

In example 8, the compactor arrangement 202 as per example 7 may furthermore comprise that the module receptacle 1004 has a first receptacle position 1004p such that selectively either the selection module 1006s or the guard module 1006n can be received in the first receptacle position 1004p.

In example 9, the compactor arrangement 202 as per any of examples 4 to 8 may furthermore comprise that the multiple function modules 1006 furthermore have a selection information module 1006, and that the at least one processor 1008 is configured to actuate the selection module 1006s on the basis of items of selection information ascertained by the selection information module 1006c when the selection module 1006s and the selection information module 1006c are received in the module receptacle 1004.

In example 10, the compactor arrangement 202 as per example 9 may furthermore comprise that the module receptacle 1004 has two first receiving positions 1004p such that selectively either the selection module 1006s, the guard module 1006n or the selection information module 1006c can be received in each of the two first receiving positions 1004p.

In example 11, the compactor arrangement 202 as per any of examples 1 to 10 may furthermore comprise that the multiple function modules 1006 may furthermore have at least one peripheral module 1006p with at least one sensor, and that the at least one processor 1008 is configured to actuate the selection module 1006s on the basis of the sensor information items ascertained by the sensor when the selection module 1006s and the at least one peripheral module 1006p are received in the module receptacle 1004.

In example 12, the compactor arrangement 202 as per example 11 may furthermore comprise that the module receptacle 1004 has two second receiving positions 1004p such that the at least one peripheral module 1006p can be received in each of the two second receiving positions 1004p.

In example 13, the compactor arrangement 202 as per any of examples 1 to 12 may furthermore comprise that the multiple function modules 1006 furthermore have a display module 1006d, and that the at least one processor 1008 is configured to display at least one operating state of the function module arrangement 1002 by means of the display module 1006d when the display module 1006d is received in the module receptacle 1004.

In example 14, the compactor arrangement 202 as per example 13 may furthermore comprise that the module receptacle 1004 has a third receptacle position 1004p such that the display module 1006d can be received in the third receptacle position 1004p.

Example 15 is a compactor arrangement 202, having: a support framework 204a for supporting a compactor 102, an empty-container transport device 202t for transporting empty containers 104 in the compactor arrangement 202, a function module arrangement 1002, which is installed on the support framework 204a above the empty-container transport device 202t, wherein the function module arrangement 1002 has: a module receptacle 1004 with multiple receptacle positions 1004 for receiving multiple function modules 1006, the multiple function modules 1006, which are designed to match the module receptacle 1004 such that the multiple function modules 1006 can each be selectively received in multiple configurations 1100c, 1100d, 1100e, 1100f in the module receptacle 1004, at least one processor 1008, which is configured to ascertain an actual configuration of the multiple configurations 1100c, 1100d, 1100e, 1100f and to selectively operate the function module arrangement 1002 in one operating mode out of multiple operating modes on the basis of the ascertained actual configuration. The function modules 1006, the at least one processor 1008, the module receptacle 1004 etc. may in this case be configured as described above in examples 2 to 14.

In example 16, the compactor arrangement 202 as per example 15 may furthermore comprise that at least one function module of the multiple function modules 1006 has an identification feature, and that the at least one processor 1008 is configured to ascertain the actual configurations on the basis of the identification feature when the at least one function module is received in at least one of the multiple receptacle positions 1004p.

In example 17, the compactor arrangement 202 as per example 15 or 16 may furthermore comprise that at least one function module of the multiple function modules 1006 has a data memory in which data are stored which represent an item of operating information of the function module arrangement 1002, and that the at least one processor 1008 is configured to ascertain the actual configurations on the basis of the item of operating information 1006i when the at least one function module is received in at least one of the multiple receptacle positions 1004p.

Example 18 is a compactor means 300, having: multiple compactor arrangements 202 as per any of examples 1 to 17, wherein the compactor arrangements 202 are arranged relative to one another such that empty containers 104 can be transported along a transport path through the compactor arrangements 202.

Example 19 is a function module arrangement 1002, having: a module receptacle 1004, multiple function modules 1006 of different function module type, which are configured such that they can be selectively received in the module receptacle 1004, at least one processor 1008 which is configured to ascertain the function module type of at least one function module received in the module receptacle 1004, and to operate the function module arrangement 1002 selectively in one operating mode of multiple operating modes on the basis of the ascertained function module type.

In example 20, the function module arrangement 1002 as per example 19 may furthermore comprise that the multiple function modules 1006 have at least one data memory for storing data which represent the function module type.

In example 21, the function module arrangement 1002 as per example 20 may furthermore comprise that the at least one processor 1008 is configured to read out the at least one data memory for the purposes of ascertaining the respective function module type.

In example 22, the function module arrangement 1002 as per any of examples 19 to 21 may furthermore comprise that the multiple function modules 1006 have at least one from the following group of function modules 1006: at least one selection module 1006$s$, at least one guard module 1006$n$, at least one selection information module 1006$c$, at least one peripheral module 1006$p$, and/or at least one display module 1006$d$.

Example 23 is a method 1200 for operating a compactor arrangement 202, the method 1200 comprising: transporting empty containers 104 by means of an empty-container transport device 202$t$ in the compactor arrangement 202; configuring a function module arrangement 1002, which is arranged above the empty-container transport device 202$t$, by introducing multiple function modules 1006 into a module receptacle 1004 of the function module arrangement 1002; ascertaining an actual configuration of the function module arrangement 1002 on the basis of the multiple function modules 1006 which are received in the module receptacle 1004; and operating the function module arrangement 1002 in an operating mode which is assigned to the actual configuration.

In example 24, the method 1200 as per example 23 may furthermore comprise: changing the actual configuration of the function module arrangement 1002 by exchanging at least one of the multiple function modules 1006 for at least one further function module of a different type; and ascertaining the changed actual configuration of the function module arrangement 1002 on the basis of the multiple function modules 1006 which are received in the module receptacle 1004.

The invention claimed is:

1. A compactor arrangement, having:
   a compactor for compacting empty containers;
   a support framework for supporting the compactor;
   an empty-container transport device for transporting empty containers toward the compactor in the compactor arrangement;
   a function module arrangement installed on the support framework, the function module arrangement positioned above the empty-container transport device, wherein the function module arrangement has:
   a module receptacle for receiving multiple function modules therein,
   the multiple function modules, which are designed to match the module receptacle such that the multiple function modules can each be selectively received in multiple configurations in the module receptacle; and
   at least one processor, which is configured to ascertain an actual configuration of the multiple configurations and to operate the function module arrangement and the compactor arrangement on the basis of the ascertained actual configuration,
   wherein the module receptacle has electrical interfaces mounted on a carrier for electrical contacting of the function modules, for supply of electrical energy to the function module respectively received in the module receptacle, and for communication with the respective function modules received in the module receptacle, and wherein the electrical interfaces are configured as data interfaces.

2. The compactor arrangement as claimed in claim 1,
   wherein each function module of the multiple function modules is assigned an item of operating information in accordance with the function thereof; and
   wherein the at least one processor is configured to ascertain the actual configurations on the basis of at least one item of operating information of at least one function module received in the module receptacle.

3. The compactor arrangement as claimed in any of claims 1 to 2,
   wherein the multiple function modules have a selection module, and
   wherein the at least one processor is configured to actuate the selection module, when the latter is received in the module receptacle, such that empty containers being transported by means of the empty-container transport device can be selectively fed to the compactor of the compactor arrangement by means of the selection module.

4. The compactor arrangement as claimed in claim 3,
   wherein the selection module is provided as a selection module of a first selection module type and of a second selection module type,
   wherein the at least one processor is furthermore configured to actuate the empty-container transport device such that the empty-container transport device is moved in a first transport direction when a selection module of the first selection module type is received in the module receptacle, and
   that the empty-container transport device is moved in a second transport direction, which differs from the first transport direction, when a selection module of the second selection module type is received in the module receptacle.

5. The compactor arrangement as claimed in claim 4,
   wherein the multiple function modules have a guard module, and
   wherein the at least one processor is configured to deactivate the compactor of the compactor arrangement when the guard module is received in the module receptacle.

6. The compactor arrangement as claimed in claim 5,
   wherein the module receptacle has a first receptacle position such that selectively one of the selection module and the guard module can be received in the first receptacle position.

7. The compactor arrangement as claimed in claim 6,
   wherein the multiple function modules furthermore have a selection information module, and
   wherein the at least one processor is configured to actuate the selection module on the basis of an item of selection information ascertained by the selection information module when the selection module and the selection information module are received in the module receptacle.

8. The compactor arrangement as claimed in claim 7, wherein the module receptacle has two first receiving positions such that selectively any one of the selection module, the guard module and the selection information module can be received in each of the two first receiving positions.

9. The compactor arrangement as claimed in any of claim 8,
wherein the multiple function modules furthermore have at least one peripheral module with at least one sensor, and
wherein the at least one processor is configured to actuate the selection module on the basis of the sensor information items ascertained by the sensor when the selection module and the at least one peripheral module are received in the module receptacle.

10. The compactor arrangement as claimed in claim 9, wherein the module receptacle has two second receiving positions such that the at least one peripheral module can be received in each of the two second receiving positions.

11. The compactor arrangement as claimed in claim 10, wherein the multiple function modules furthermore have a display module, and
wherein the at least one processor is configured to display at least one operating state of the function module arrangement by means of the display module when the display module is received in the module receptacle.

12. The compactor arrangement as claimed in claim 11, wherein the module receptacle has a third receptacle position such that the display module can be received in the third receptacle position.

13. A method for operating a compactor arrangement, the method comprising:
transporting empty containers by means of an empty-container transport device toward a compactor in the compactor arrangement,
configuring a function module arrangement, which is installed above the empty-container transport device, by introducing multiple function modules into a module receptacle of the function module arrangement;
ascertaining an actual configuration of the function module arrangement on the basis of the multiple function modules which are received in the module receptacle; and
operating the function module arrangement on the basis of the ascertained actual configuration,
wherein the module receptacle has electrical interfaces mounted on a carrier for electrical contacting of the function modules, for supply of electrical energy to the function module respectively received in the module receptacle, and for communication with the respective function modules received in the module receptacle, and wherein the electrical interfaces are configured as data interfaces.

14. The method of claim 13 further comprising:
transporting the empty container along a transport path through the compactor arrangement and an other compactor arrangement.

* * * * *